United States Patent
Seo et al.

(10) Patent No.: US 9,794,014 B2
(45) Date of Patent: Oct. 17, 2017

(54) METHOD FOR RECEIVING SIGNAL USING INTERFERENCE REMOVAL SCHEME AND APPARATUS FOR SAME IN WIRELESS COMMUNICATION SYSTEM

(71) Applicant: LG ELECTRONICS INC., Seoul (KR)

(72) Inventors: Hanbyul Seo, Anyang-si (KR); Yunjung Yi, Anyang-si (KR); Kijun Kim, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 223 days.

(21) Appl. No.: 14/427,600

(22) PCT Filed: Sep. 3, 2013

(86) PCT No.: PCT/KR2013/007931
§ 371 (c)(1),
(2) Date: Mar. 11, 2015

(87) PCT Pub. No.: WO2014/042378
PCT Pub. Date: Mar. 20, 2014

(65) Prior Publication Data
US 2015/0249517 A1   Sep. 3, 2015

Related U.S. Application Data

(60) Provisional application No. 61/700,311, filed on Sep. 12, 2012, provisional application No. 61/760,644, (Continued)

(51) Int. Cl.
*H04J 11/00* (2006.01)
*H04W 16/10* (2009.01)
(Continued)

(52) U.S. Cl.
CPC ........ *H04J 11/0056* (2013.01); *H04L 5/0051* (2013.01); *H04L 5/0073* (2013.01);
(Continued)

(58) Field of Classification Search
None
See application file for complete search history.

(56) References Cited

U.S. PATENT DOCUMENTS 7,075,906 B2 * 7/2006 Douglas ................ H04W 24/02
370/328
8,412,104 B2 * 4/2013 Shin .................... H04W 28/048
370/329
(Continued)

FOREIGN PATENT DOCUMENTS

KR   10-2010-0027945 A   3/2010
KR   10-2012-0052654 A   5/2012

OTHER PUBLICATIONS

Ohwatari et al., "Investigation on Advanced Receiver Employing Interference Rejection Combining in Asynchronous Network for LTE-Advanced Downlink", In: Vehicular Technology Conference (VTC spring), 2012 IEEE 75th, May 6-9, 2012, 6 pages.
(Continued)

*Primary Examiner* — Mounir Moutaouakil
(74) *Attorney, Agent, or Firm* — Birch, Stewart, Kolasch & Birch, LLP

(57) ABSTRACT

The present invention relates to a method by which a terminal receives a downlink signal from a base station in a wireless communication system. In detail, the method includes the steps of: receiving information about resource elements for interference channel estimation from an adjacent base station; estimating the interference channel from the adjacent base station using the resource elements for the interference channel estimation; and applying reception beam forming to avoid the interference channel and receive
(Continued)

the downlink signal from the base station, wherein the downlink signal is not mapped to the resource elements for the interference channel estimation.

8 Claims, 17 Drawing Sheets

Related U.S. Application Data filed on Feb. 4, 2013, provisional application No. 61/761,672, filed on Feb. 6, 2013.

(51) Int. Cl.
    *H04W 16/28* (2009.01)
    *H04W 72/04* (2009.01)
    *H04L 5/00* (2006.01)

(52) U.S. Cl.
    CPC ........... *H04W 16/10* (2013.01); *H04W 16/28* (2013.01); *H04W 72/042* (2013.01); *H04L 5/0007* (2013.01)

(56) References Cited

U.S. PATENT DOCUMENTS

| | | | |
|---|---|---|---|
| 9,398,483 B2* | 7/2016 | Behravan | H04B 7/024 |
| 2005/0088998 A1* | 4/2005 | Douglas | H04W 24/02 |
| | | | 370/338 |
| 2009/0019150 A1 | 1/2009 | Li et al. | |
| 2011/0305295 A1* | 12/2011 | Kim | H04L 5/0044 |
| | | | 375/295 |
| 2012/0122502 A1* | 5/2012 | Shin | H04W 28/048 |
| | | | 455/501 |
| 2014/0241276 A1* | 8/2014 | Berberana | H04W 72/082 |
| | | | 370/329 |
| 2015/0208263 A1* | 7/2015 | Behravan | H04B 7/024 |
| | | | 370/252 |

OTHER PUBLICATIONS

Ohwatari et al., "Performance of Advanced Receiver Employing Interference Rejection Combining to Suppress Inter-cell Interference in LTE-Advanced Downlink", In: Vehicular Technology Conference (VTC fall), 2011 IEEE, Sep. 5-8, 2011, 7 pages.

* cited by examiner

FIG. 2
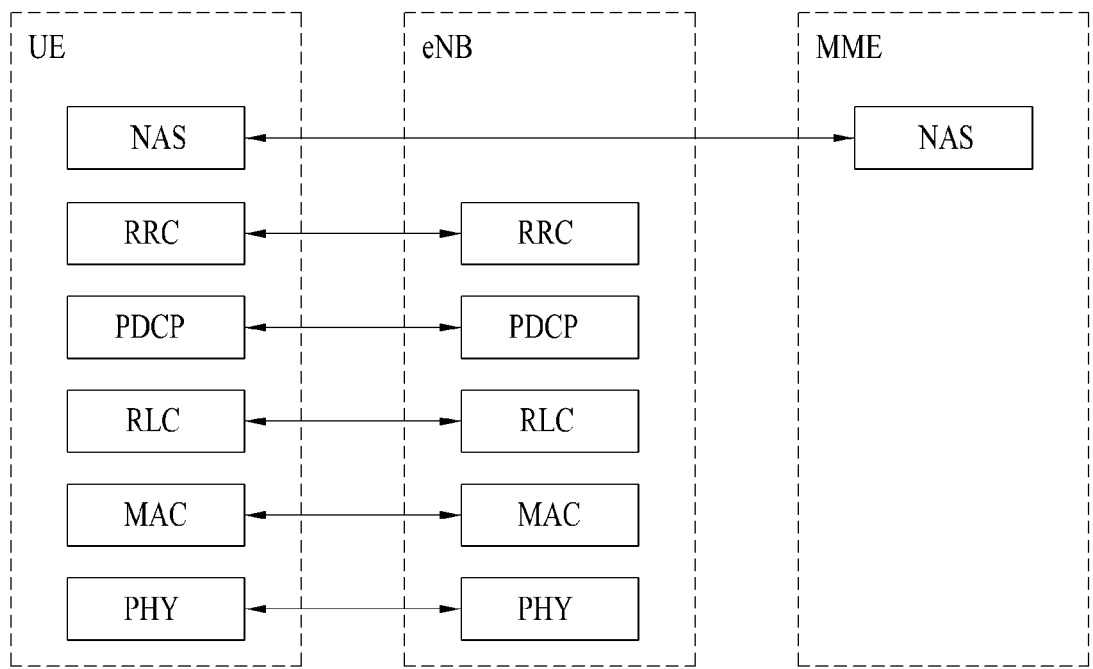
(a) control plane protocol stack
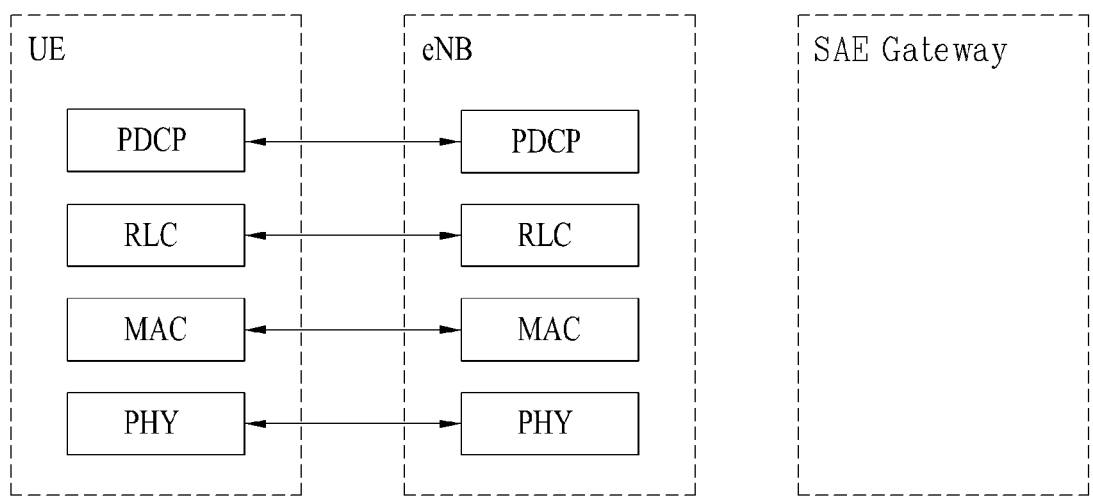
(b) user plane protocol stack ☒ : DMRS group 1

☒ : DMRS group 2

FIG. 12

FIG. 16
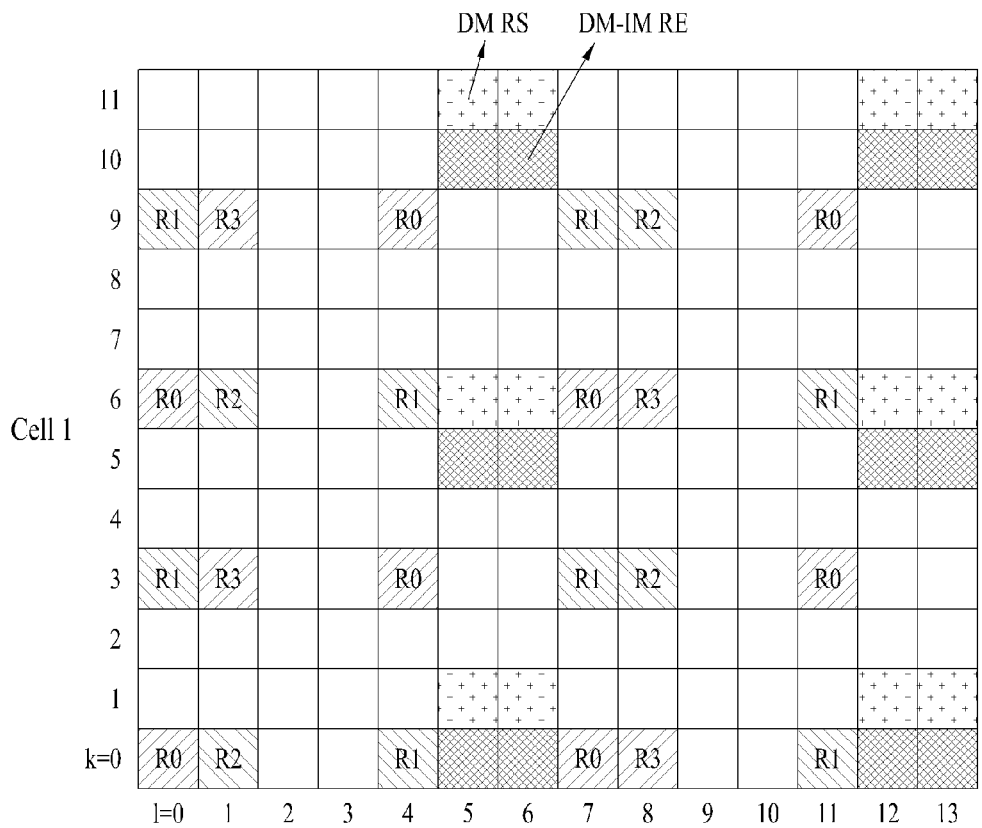
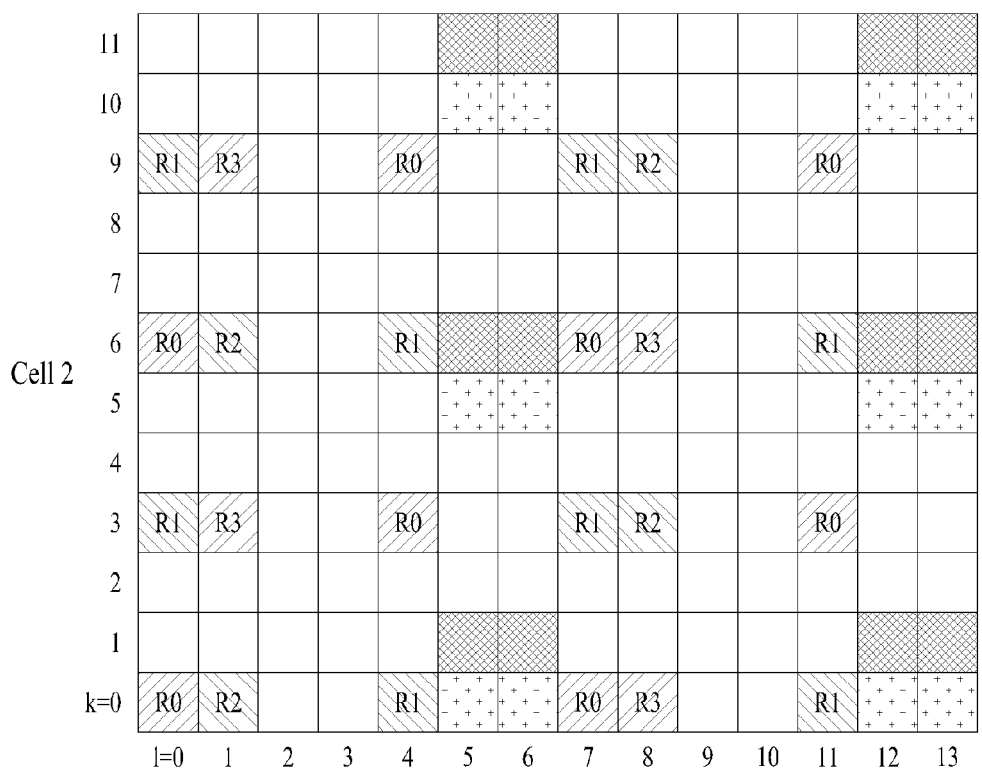

METHOD FOR RECEIVING SIGNAL USING INTERFERENCE REMOVAL SCHEME AND APPARATUS FOR SAME IN WIRELESS COMMUNICATION SYSTEM

CROSS REFERENCE TO RELATED APPLICATIONS

This application is the National Phase of PCT International Application No. PCT/KR2013/007931, filed on Sep. 3, 2013, which claims priority under 35 U.S.C. 119(e) to U.S. Provisional Application Nos. 61/700,311, filed on Sep. 12, 2012, 61/760,644 filed on Feb. 4, 2013 and 61/761,672 filed on Feb. 6, 2013, all of which are hereby expressly incorporated by reference into the present application.

TECHNICAL FIELD

The present invention relates to a wireless communication system and, more particularly, to a method and apparatus for receiving a signal using an interference cancellation scheme in a wireless communication system.

BACKGROUND ART

As an example of a wireless communication system to which the present invention is applicable, a 3rd Generation Partnership Project (3GPP) Long Term Evolution (LTE) communication system will be schematically described.

FIG. 1 is a diagram showing a network structure of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include an AG, a network node for user registration of the UE, etc. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention devised to solve the problem lies in a method and apparatus for receiving a signal using an interference cancellation scheme in a wireless communication system.

Technical Solution

The object of the present invention can be achieved by providing a method for receiving a downlink signal at a user equipment (UE) from a base station in a wireless communication system including receiving, from the base station, information about resource elements for estimation of an interference channel from a neighboring base station, estimating the interference channel from the neighboring base station using the resource elements for estimation of the interference channel, and receiving the downlink signal from the base station by applying reception beamforming to avoid the interference channel, wherein the downlink signal is not mapped to the resource elements for estimation of the interference channel. Rank of the downlink signal may be 1 or 2.

In another aspect of the present invention, provided herein is a user equipment (UE) apparatus in a wireless communication system including a wireless communication module configured to transmit and receive a signal to and from a base station, and a processor configured to process the signal, wherein the processor controls the wireless communication module to receive, from the base station, information about resource elements for estimation of an interference channel from a neighboring base station, to estimate the interference channel from the neighboring base station using the resource elements for estimation of the interference channel, and to receive the downlink signal from the base station by applying reception beamforming to avoid the interference channel, wherein the downlink signal is not mapped to the resource elements for estimation of the interference channel. Rank of the downlink signal may be 1 or 2.

The resource elements for estimation of the interference channel may be defined as resource elements for a channel status information-reference signal (CSI-RS) or resource elements for a demodulation-reference signal (DM-RS).

Information about candidates of the resource elements for estimation of the interference channel may be further received via a higher layer, and the information about the resource elements for estimation of the interference channel may indicate valid resource elements among the candidates. The downlink signal may not be mapped to candidates of the resource elements for estimation of the interference channel.

If the resource elements for estimation of the interference channel are defined as the resource elements for the DM-RS, the resource elements of the DM-RS for receiving the downlink signal may be orthogonal to the resource elements for estimation of the interference channel. The locations of the resource elements of the DM-RS for receiving the downlink signal may be differently configured with respect to the resource blocks allocated to the UE.

Advantageous Effects

According to embodiments of the present invention, in a wireless communication system, a receiver can more efficiently receive a signal using an interference cancellation scheme.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram illustrating structures of a control plane and a user plane of a radio interface protocol between a UE and an E-UTRAN based on the 3GPP radio access network specification.

FIG. 12 is a diagram showing the location of a DM-RS and the location of a CSI-RS in a 3GPP LTE system.

FIG. 16 is a diagram showing an example of configuring different DM-RS RE and DM-IM RE configurations in a plurality of cells according to a second embodiment of the present invention.

BEST MODE

Figure 1:
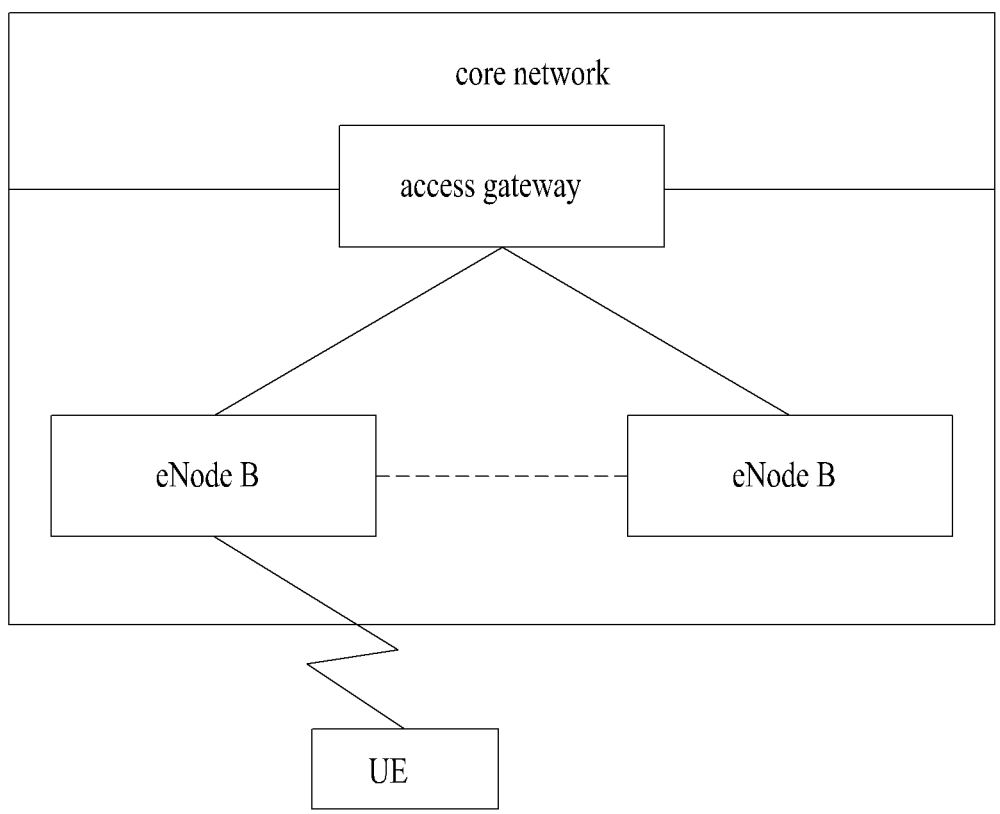
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
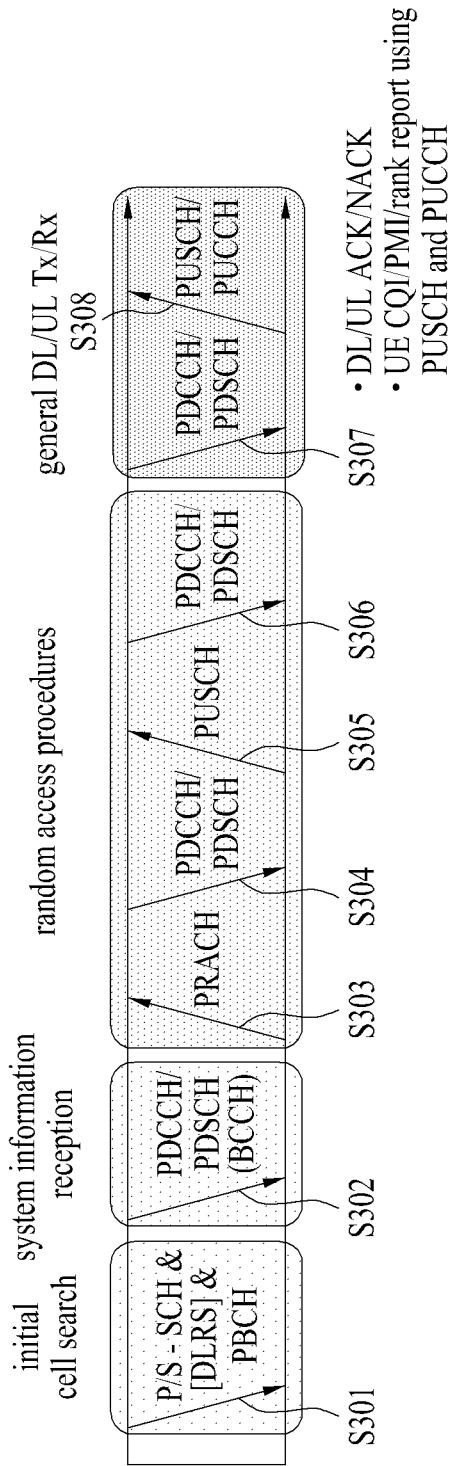
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
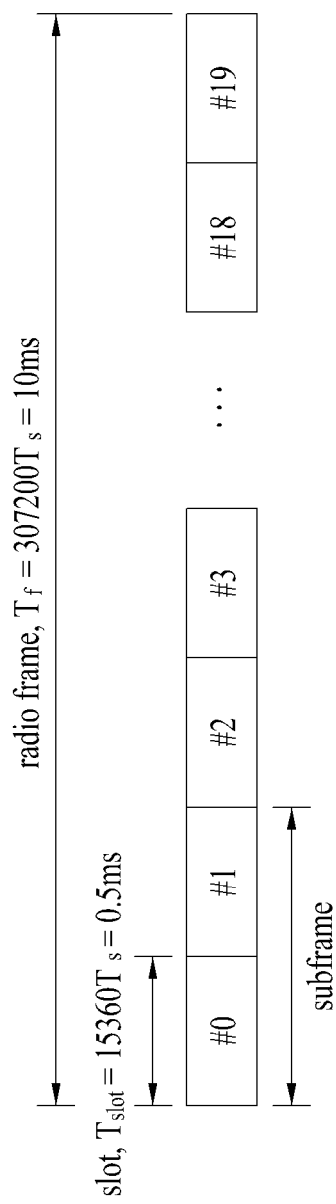
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10-8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
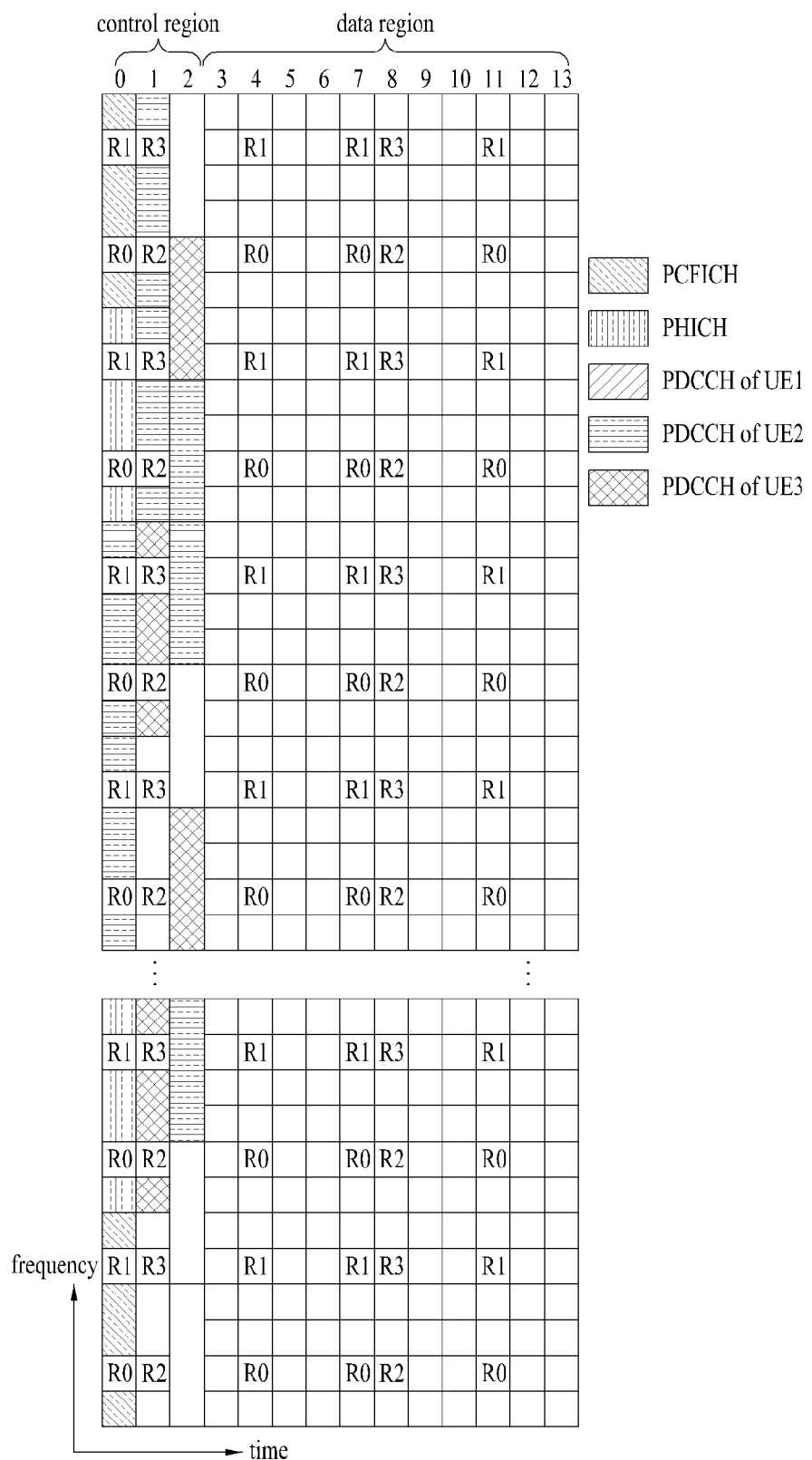
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIGS. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
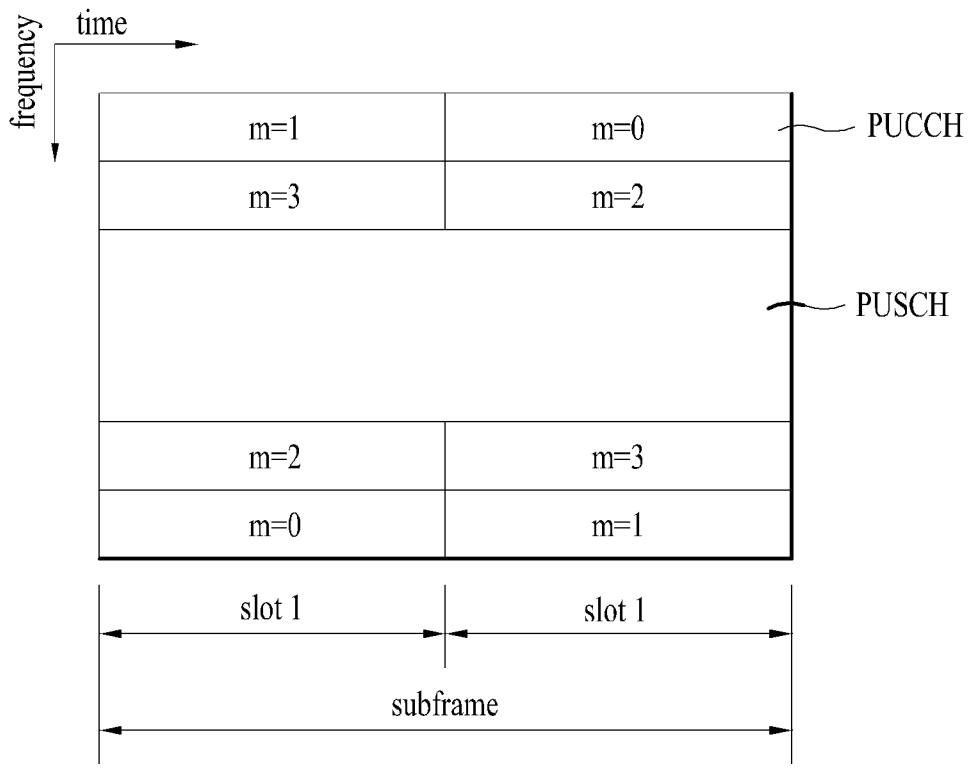
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
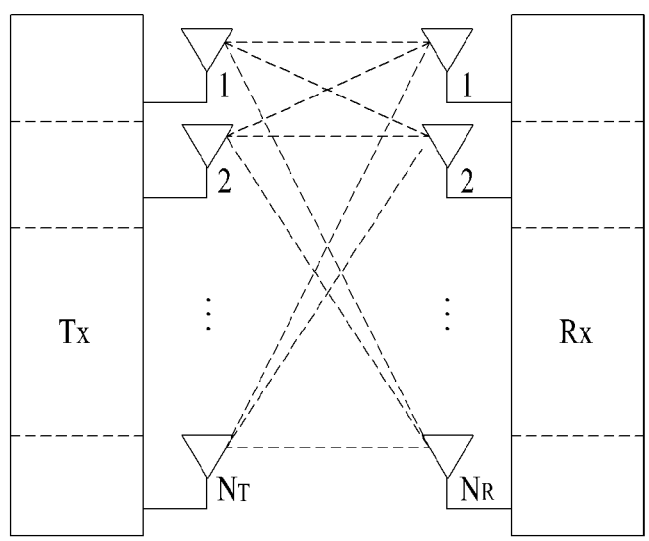
FIG. 7 is a diagram illustrating a configuration of a general MIMO communication system.

FIG. 7 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed as the following vector.

$$S = [S_1, S_2, \ldots, S_{N_T}]^T \quad \text{[Equation 2]}$$

Individual pieces of the transmission information $S_1, S_2, \ldots, S_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, $N_T$ transmission signals $x_1, x_2, \ldots, x_{N_T}$ to be actually transmitted may be configured by multiplying the transmission power-controlled information vector $\hat{S}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$
$$= W\hat{s} = WPs$$

[Equation 5]

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

It is expected that the next-generation mobile communication standard, LTE-A, will support coordinated multipoint (CoMP) transmission in order to increase data transmission rate, compared to the legacy LTE standard. CoMP refers to transmission of data to a UE through cooperation among two or more eNBs or cells in order to increase communication performance between a UE located in a shadow area and an eNB (a cell or sector).

CoMP transmission schemes may be classified into CoMP-Joint processing (CoMP-JP) called cooperative MIMO characterized by data sharing, and CoMP-coordinated scheduling/beamforming (CoMP-CS/CB).

In DL CoMP-JP, a UE may instantaneously receive data simultaneously from eNBs that perform CoMP transmission and may combine the received signals, thereby increasing reception performance (joint transmission (JT)). In addition, one of the eNBs participating in the CoMP transmission may transmit data to the UE at a specific time point (dynamic point selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (joint reception (JR)). In contrast, in UL CoMP-CS/CB, only one eNB receives a PUSCH from a UE. Here, cooperative cells (or eNBs) may make a decision as to whether to use CoMP-CS/CB.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1\,W2) \quad \text{[Equation 8]}$$

In Equation 8, W2 is a short-term PMI, which is a codeword of a codebook reflecting short-term channel information, W is a codeword of a final codebook, and norm (A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \text{where } X_i \text{ is } Nt/2 \text{ by } M \text{ matrix}$$ [Equation 9]

$$W2(j) = \overbrace{\begin{bmatrix} e_M^k & e_M^l & e_M^m \\ \alpha_j e_M^k & \beta_j e_M^l & \cdots & \gamma_j e_M^m \end{bmatrix}}^{r \text{ columns}} (\text{if rank} = r),$$

where $1 \leq k, l, m \leq M$ and $k, l, m$ are integer.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

$$W1(i) * W2(j) = \begin{bmatrix} X_i(k) \\ \alpha_j X_i(k) \end{bmatrix}$$ [Equation 10]

In Equation 10, a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a discrete Fourier transform (DFT) matrix may be used for $X_i(k)$.

An advanced system such as an LTE-A system considers achievement of an additional multi-user diversity by the use of MU-MIMO. Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in SU-MIMO should be reported in MU-MIMO.

In CoMP JT, because a plurality of eNBs transmits the same data to a specific UE through cooperation, the eNBs may be theoretically regarded as forming a MIMO system with antennas distributed geographically. That is, even when MU-MIMO is implemented in JT, highly accurate CSI is required to avoid interference between CoMP-scheduled UEs as in a single cell MU-MIMO operation. The same applies to CoMP CB. That is, to avoid interference with a serving cell caused by a neighbor cell, accurate CSI is needed. In general, a UE needs to report an additional CSI feedback in order to increase the accuracy of CSI feedback. The CSI feedback is transmitted on a PUCCH or a PUSCH to an eNB.

Now a detailed description of an RS will be given.

In general, a transmitter transmits an RS known to both the transmitter and a receiver to the receiver along with data so that the receiver may perform channel measurement in the RS. The RS serves to perform demodulation by indicating a modulation scheme as well as channel measurement. The RS is classified into a dedicated RS (DRS) for a specific UE and a common RS (or cell-specific RS (CRS)) for all UEs within a cell. The CRS includes an RS used by a UE to measure a CQI/PMI/RI to be reported to an eNB. This RS is referred to as a channel state information-RS (CSI-RS).

Figure 8:
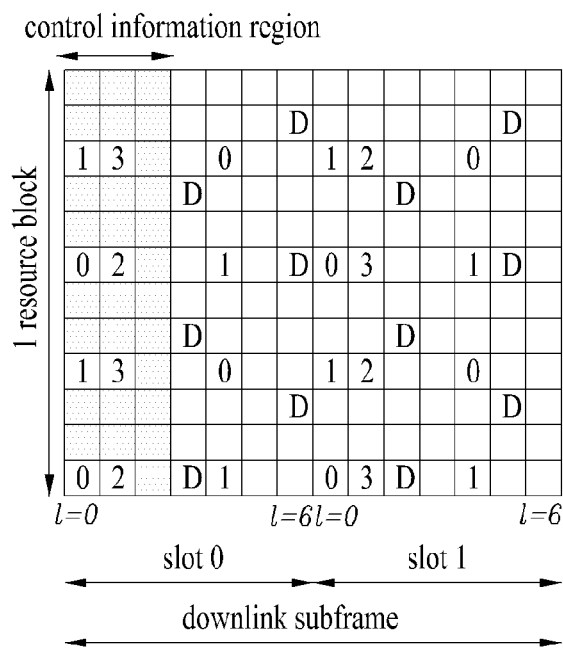
FIGS. 8 and 9 are diagrams illustrating DL RS configurations in an LTE system supporting DL transmission through four antennas.
Figure 9:
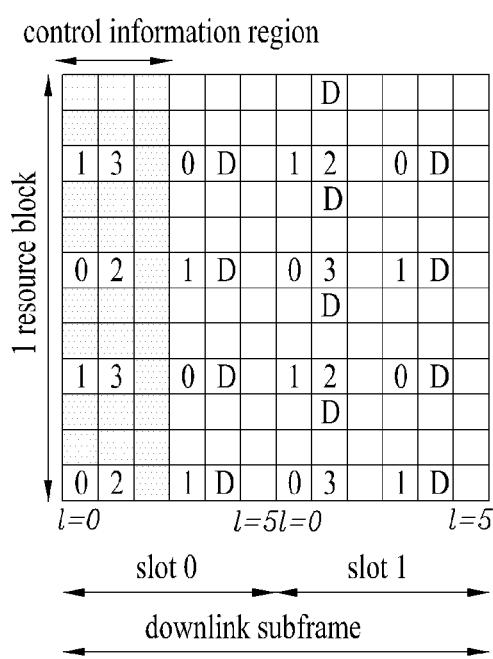

FIGS. 8 and 9 illustrate RS configurations in an LTE system supporting DL transmission through four antennas. Specifically, FIG. 8 illustrates an RS configuration in the case of a normal CP and FIG. 9 illustrates an RS configuration in the case of an extended CP.

Referring to FIGS. 8 and 9, reference numerals 0 to 3 indicated in grids denote cell-specific RSs, CRSs, transmitted through antenna port 0 to antenna port 3, for channel measurement and data modulation. The CRSs may be transmitted to UEs across a control information region as well as a data information region.

Reference character D indicated in grids denotes a UE-specific RS, i.e. a DM-RS. M-RSs are transmitted in a data region, that is, on a PDSCH, to support single-antenna port transmission. The existence/absence of a UE-specific RS, DM-RS, is indicated to a UE by higher-layer signaling. In FIGS. 8 and 9, the DM-RSs are transmitted through antenna port 5. 3GPP TS 36.211 defines DM-RSs for a total of eight antenna ports, antenna port 7 to antenna port 14.

Figure 10:
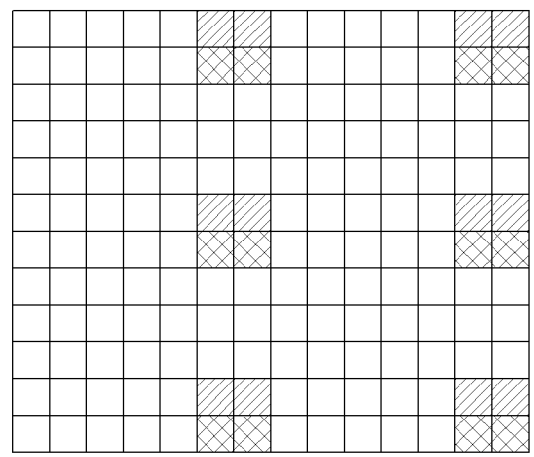
FIG. 10 illustrates exemplary DL DM-RS allocation defined in a current 3GPP standard specification.

FIG. 10 illustrates exemplary DL DM-RS allocation defined in a current 3GPP standard specification.

Referring to FIG. 10, DM-RSs for antenna ports 7, 8, 11, and 13 are mapped using sequences for the respective antenna ports in DM-RS group 1, whereas DM-RSs for antenna ports 9, 10, 12, and 14 are mapped using sequences for the respective antenna ports in DM-RS group 2.

As compared to CRS, CSI-RS was proposed for channel measurement of a PDSCH and up to 32 different resource configurations are available for CSI-RS to reduce inter-cell interference (ICI) in a multi-cell environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. Table 1 and Table 2 list CSI-RS configurations defined in the 3GPP standard. Specifically, Table 1 lists CSI-RS configurations in the case of a normal CP and Table 2 lists CSI-RS configurations in the case of an extended CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |

TABLE 2-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 26 | (1, 1) | 1 | | | | |
| 27 | (0, 1) | 1 | | | | |

In Table 1 and Table 2, (k', l') represents an RE index where k' is a subcarrier index and l' is an OFDM symbol index.

In addition, a CSI-RS subframe configuration may be defined by a periodicity in subframes, $T_{CSI-RS}$, and a subframe offset $\Delta_{CSI-RS}$. Table 3 lists CSI-RS subframe configurations defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Meanwhile, information about a zero power (ZP) CSI-RS illustrated in Table 4 is configured through an RRC layer signal. Particularly, a ZP CSI-RS resource configuration includes zeroTxPowerSubframeConfig and zeroTxPowerResourceConfigList of a 16-bit bitmap. zeroTxPowerSubframeConfig indicates a CSI-RS transmission periodicity and subframe offset of a ZP CSI-RS by $I_{CSI-RS}$ illustrated in Table 3. zeroTxPowerResourceConfigList indicates a ZP CSI-RS configuration. The elements of this bitmap indicate the respective configurations included in the columns for four CSI-RS antenna ports in Table 1 or Table 2. A normal CSI-RS other than ZP CSI-RS is referred to as non zero-power (NZP) CSI-RS.

TABLE 4

```
-- ASN1START
CSI-RS-Config-r10 ::=    SEQUENCE {
    csi-RS-r10              CHOICE {
        ...
    }
    zeroTxPowerCSI-RS-r10   CHOICE {
        release                             NULL,
        setup                               SEQUENCE {
            zeroTxPowerResourceConfigList-r10   BIT STRING (SIZE (16)),
            zeroTxPowerSubframeConfig-r10       INTEGER (0..154)
        }
    }
}
-- ASN1STOP
```

The current 3GPP standard defines modulation orders and cording rates for respective CQI indexes as illustrated in Table 5.

TABLE 5

| CQI index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

A CQI is calculated based on interference measurement as follows.

A UE needs to measure a Signal to Interference and Noise Ratio (SINR) for CQI calculation. In this case, the UE may measure the reception power (S-measure) of a desired signal in an RS such as a Non-Zero Power (NZP) CSI-RS. For interference power measurement (I-measure or Interference Measurement (IM)), the UE measures the power of an interference signal resulting from eliminating the desired signal from a received signal.

CSI measurement subframe sets $C_{CSI,0}$ and $C_{CSI,1}$ may be configured by higher-layer signaling and the subframes of each subframe set are different from the subframes of the other subframe set. In this case, the UE may perform S-measure in an RS such as a CSI-RS without any specific subframe constraint. However, the UE should calculate CQIs separately for the CSI measurement subframe sets $C_{CSI,0}$ and $C_{CSI,1}$ through separate I-measures in the CSI measurement subframe sets $C_{CSI,0}$ and $C_{CSI,1}$.

Hereinbelow, transmission modes for a DL data channel will be described.

A current 3GPP LTE standard specification, 3GPP TS 36.213 defines DL data channel transmission modes as illustrated in Table 6 and Table 7. A DL data channel transmission mode is indicated to a UE by higher-layer signaling, that is, RRC signaling.

TABLE 6

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DCI format 2A | Large delay CDD or Transmit diversity |

TABLE 6-continued

| Transmission mode | DCI format | Transmission scheme of PDSCH corresponding to PDCCH |
|---|---|---|
| Mode 4 | DCI format 1A | Transmit diversity |
| | DCI format 2 | Closed-loop spatial multiplexing or Transmit diversity |
| Mode 5 | DCI format 1A | Transmit diversity |
| | DCI format 1D | Multi-user MIMO |
| Mode 6 | DCI format 1A | Transmit diversity |
| | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
| | DCI format 1 | Single-antenna port, port 5 |
| Mode 8 | DCI format 1A | If the number of PBCH antenna ports is one, Single-antenna port, port 0 is used, otherwise Transmit diversity |
| | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity. MBSFN subframe: Single-antenna port, port 7 |
| | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity. MBSFM subframe: Single-antenna port, port 7 |
| | DCI format 2D | Up to 8 layer transmission, ports 7-14 or single-antenna port, port 7 or 8 |

TABLE 7

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DCI format 2A | Transmit diversity |
| Mode 4 | DCI format 1A | Transmit diversity |
| | DCI format 2 | Transmit diversity |
| Mode 5 | DCI format 1A | Transmit diversity |
| Mode 6 | DCI format 1A | Transmit diversity |
| Mode 7 | DCI format 1A | Single-antenna port, port 5 |
| | DCI format 1 | Single-antenna port, port 5 |
| Mode 8 | DCI format 1A | Single-antenna port, port 7 |
| | DCI format 2B | Single-antenna port, port 7 or 8 |
| Mode 9 | DCI format 1A | Single-antenna port, port 7 |
| | DCI format 2C | Single-antenna port, port 7 or 8, |
| Mode 10 | DCI format 1A | Single-antenna port, port 7 |
| | DCI format 2D | Single-antenna port, port 7 or 8, |

Referring to Table 6 and Table 7, the 3GPP LTE standard specification defines DCI formats according to the types of RNTIs by which a PDCCH is masked. Particularly for C-RNTI and SPS C-RNTI, the 3GPP LTE standard specification defines transmission modes and DCI formats corresponding to the transmission modes, that is, transmission mode-based DCI formats as illustrated in Table 6 and Table 7. DCI format 1A is additionally defined for application irrespective of transmission modes, that is, for a fall-back mode. Table 6 illustrates transmission modes for a case where a PDCCH is masked by a C-RNTI and Table 7 illustrates transmission modes for a case where a PDCCH is masked by an SPS C-RNTI.

Referring to Table 6, if a UE detects DCI format 1B by blind-decoding a PDCCH masked by a C-RNTI, the UE decodes a PDSCH, assuming that the PDSCH has been transmitted in a single layer by closed-loop spatial multiplexing.

In Table 6 and Table 7, Mode 10 is a DL data channel transmission mode for CoMP. For example, in Table 6, if the UE detects DCI format 2D by blind-decoding a PDCCH masked by a C-RNTI, the UE decodes a PDSCH, assuming that the PDSCH has been transmitted through antenna port 7 to antenna port 14, that is, based on DM-RSs by a multi-layer transmission scheme, or assuming that the PDSCH has been transmitted through a single antenna port, DM-RS antenna port 7 or 8.

On the contrary, if the user equipment performs blind decoding on PDCCH masked with C-RNTI and then detects a DCI format 1A, a transmission mode varies according to whether a corresponding subframe corresponds to an MBSFN subframe. For instance, if the corresponding subframe corresponds to a non-MBSFN subframe, the user equipment decodes PDSCH in an assumption that the PDSCH has been transmitted with a single antenna transmission scheme based on a CRS of an antenna port 0 or a CRS-based transmit diversity scheme. And, if the corresponding subframe corresponds to an MBSFN subframe, the user equipment decodes the PDSCH in an assumption that the PDSCH has been transmitted with a single antenna transmission based on a DM-RS of an antenna port 7.

Now a description will be given of QCL between antenna ports.

If one antenna port is quasi co-located with another antenna port, this means that a UE may assume that the large-scale properties of a signal received from one antenna port (or a radio channel corresponding to the antenna port) are wholly or partially identical to those of a signal received from another antenna port (or a radio channel corresponding to the antenna port). The large-scale properties may include Doppler spread and Doppler shift which are associated with a frequency offset, average delay and delay spread which are associated with a timing offset, and average gain.

According to the definition of QCL, the UE may not assume that antenna ports that are not quasi co-located with each other have the same large-scale properties. Therefore, the UE should independently perform a tracking procedure in order to obtain the frequency offset and timing offset of each antenna port.

Meanwhile, the UE may perform the following operations regarding quasi co-located antenna ports.

1) The UE may identically apply estimated results of a power-delay profile of a radio channel corresponding to a specific antenna port, delay spread, Doppler spectrum, and Doppler spread to Wiener filter parameters used in channel estimation of a radio channel corresponding another antenna port.

2) The UE may acquire time synchronization and frequency synchronization of the specific antenna port and apply the same synchronization to another antenna port.

3) Finally, the UE may calculate the average of reference signal received power (RSRP) measurements of the quasi co-located antenna ports as an average gain.

For example, it is assumed that upon receipt of scheduling information of a DM-RS based DL data channel, e.g. DCI format 2C, through a PDCCH (or an enhanced PDCCH (E-PDCCH)), the UE performs channel estimation on a PDSCH using a DM-RS sequence indicated by the scheduling information and then demodulates data.

In this case, if a DM-RS antenna port for DL data channel demodulation is quasi co-located with a CRS antenna port of a serving cell, the UE may apply large-scale properties of a radio channel, which have been estimated from the CRS antenna port thereof, to channel estimation through the DM-RS antenna port, thereby improving the reception performance of the DM-RS based DL data channel.

Similarly, if the DM-RS antenna port for DL data channel demodulation is quasi co-located with the CSI-RS antenna port of the serving cell, the UE may apply large-scale properties of a radio channel, which have been estimated from the CSI-RS antenna port of the serving cell, to channel estimation through the DM-RS antenna port, thereby improving the reception performance of the DM-RS based DL data channel.

Meanwhile, in LTE, it is regulated that when a DL signal is transmitted in mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with large-scale properties except average gain. This means that physical channels and signals are transmitted in the same point. On the other hand, QCL type B is defined such that up to four QCL modes are configured for each UE by a higher-layer message to enable CoMP transmission such as DPS or JT and which QCL mode is used to receive a DL signal is dynamically configured through DCI.

DPS transmission in the case of QCL type B will now be described in more detail.

It is assumed that node #1 having NI antenna ports transmits CSI-RS resource #1 and node #2 having N2 antenna ports transmits CSI-RS resource #2. In this case, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within a common overage of node #1 and node #2 by a higher-layer signal.

Then, the eNB may perform DPS by configuring, using DCI, QCL mode parameter set #1 for the UE during data (i.e. a PDSCH) transmission to the UE through node #1 and configuring QCL mode parameter set #2 for the UE during data transmission to the UE through node #2. If QCL mode parameter set #1 is configured for the UE through the DCI, the UE may assume that CSI-RS resource #1 is quasi co-located with a DM-RS and if QCL mode parameter set #2 is configured for the UE, the UE may assume that CSI-RS resource #2 is quasi co-located with the DM-RS.

The present invention proposes a method for operating interference rejection receive (IRR) in order to avoid interference from a neighboring transmission point (TP).

Figure 11:
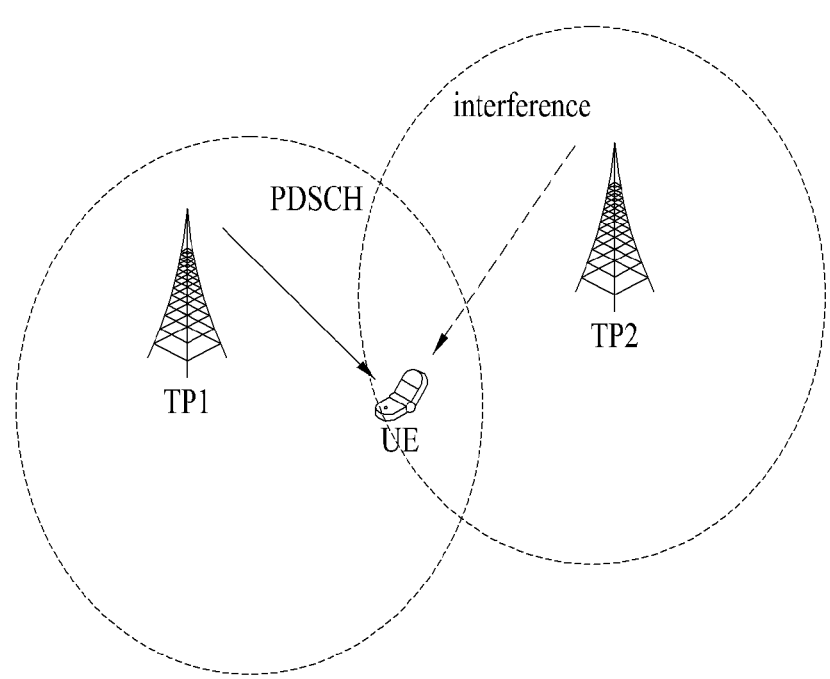
FIG. 11 is a diagram showing a state in which interference from a neighboring transmission point occurs.

FIG. 11 is a diagram showing a state in which interference from a neighboring transmission point occurs.

Referring to FIG. 11, a UE receives a PDSCH from TP #1 but interferes with downlink transmission of TP #2. At this time, when channel information of interference from TP #2 is checked and the direction of interference is checked in a state in which multiple receive antennas are implemented in the UE, the UE may perform reception beamforming in a direction avoiding the interference direction to receive the PDSCH. Such operation is referred to as interference rejection receive (IRR). As compared to normal reception operation, IRR advantageously avoids an interference signal, thereby improving reception performance of a UE in an environment in which interference between TPs are severe.

As an example of such IRR operation, there is a zero forcing (ZF) receiver shown in Equation 11 below. In this method, a signal is received in a direction in which an interference signal is null, that is, a direction in which an interference signal does not exist.

$$W_{ZF} = \text{null}(H_I F_I) = (I - H_I F_I (H_I F_I)^\dagger)$$ Equation 11

As another example of such IRR operation, there is a minimum mean squared error (MMSE) receiver shown in Equation 12 below. The MME receiver operates to receive a signal in a direction capable of amplifying a desired signal component while reducing an interference signal to a sufficiently low level although an interference signal is not null.

$$W_{MMSE} = F_S^H H_S^H (H_S F_S F_S^H H_S^H + H_I F_I F_I^H H_I^H + \sigma^2 I)^{-1}$$ Equation 12

In Equation 12 above, $H_S$ and $F_S$ respectively denote the channel and precoding matrix of a desired TP, that is, TP #1 and $H_I$ and $F_I$ respectively denote the channel and precoding matrix of an interference TP, that is, TP #2. In addition, IRR operation can be variously implemented.

In order to appropriately apply the IRR operation, channel estimation of a PDSCH signal and an interference signal needs to be accurately performed. This is because IRR is designed based on an estimated channel and thus interference cannot be reduced if channel estimation is inaccurate.

In normal IRR operation, channel estimation of the interference signal is performed based on a DM-RS used by a received signal. Since the UE pre-confirms an RE and signature used to transmit a DM-RS for a PDSCH thereof, the UE estimates the channel of the PDSCH using the DM-RS thereof, removes the DM-RS signature from the RE, regards the remaining component as interference, and estimates the interference channel.

This method has two disadvantages. First, since channel estimation of the PDSCH using the DM-RS is performed in a state in which interference from the neighboring TP is not avoided, channel estimation of the PDSCH may become inaccurate due to interference. Second, channel estimation of the PDSCH using the DM-RS is not complete and, as a result, some components of the DM-RS signature remain even in a state in which the DM-RS signature is removed, thereby causing interference channel estimation errors.

Figure 12:
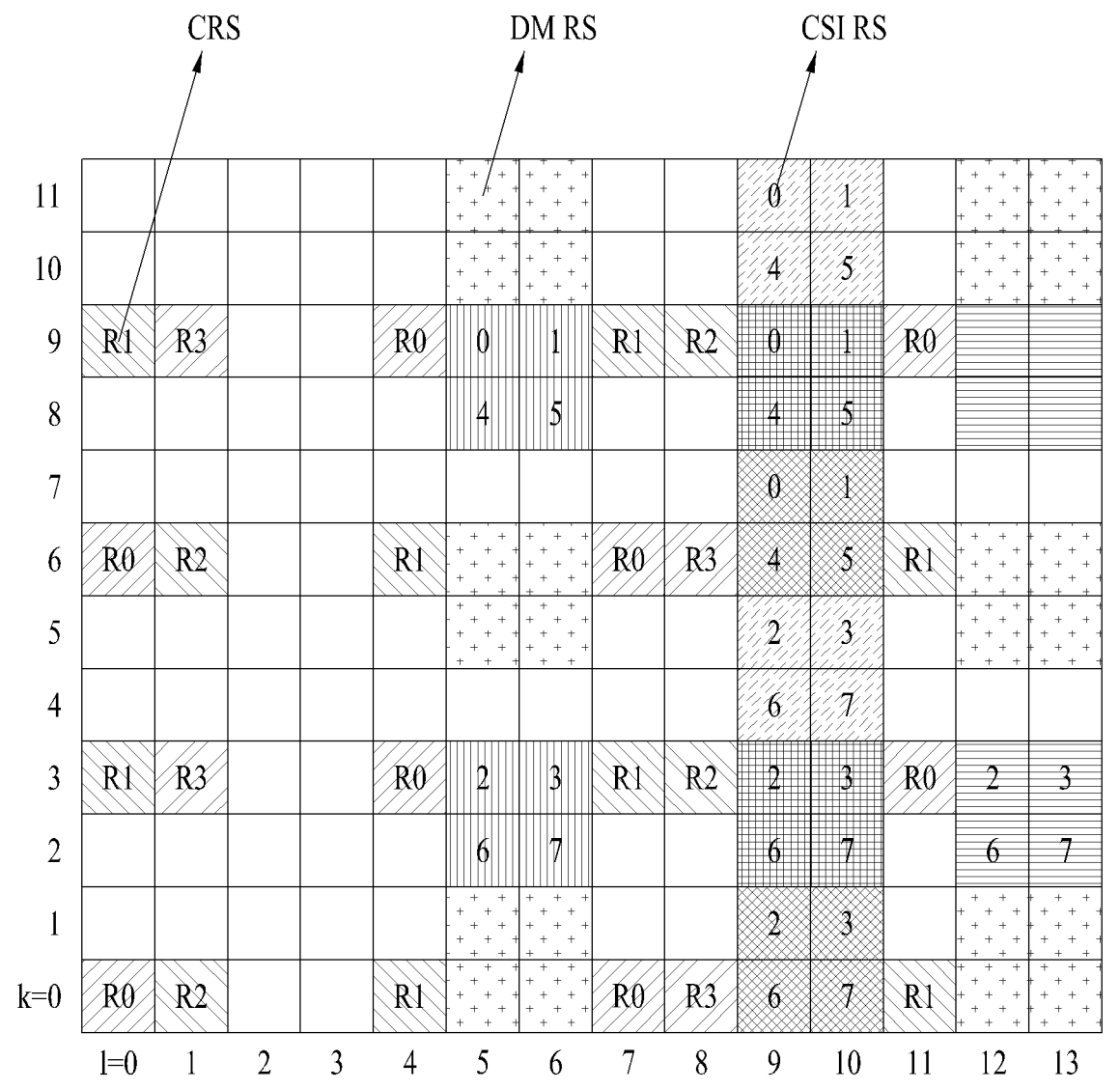

FIG. 12 is a diagram showing the location of a DM-RS and the location of a CSI-RS in a 3GPP LTE system. In particular, in FIG. 12, assume that a CRS is defined by four antenna ports and a total of 24 REs is used for the DM-RS. However, the number of used DM-RS REs may be reduced according to rank of the PDSCH. For example, if rank is 1 or 2, only 12 REs may be used for the DM-RS.

In addition, REs having numerals of 0 to 7 in a grid denote REs configured with CSI-RSs. In FIG. 12, one 8-antenna-port CSI-RS is configured using eight REs having the same pattern based on a CSI-RS of 8 antenna ports. When the number of antenna ports of the CSI-RS is reduced, the CSI-RS may be configured in a smaller unit. For example, in the case of a 4-antenna-port CSI-RS, one CSI-RS configuration may be configured with an RE corresponding to CSI-RS antenna port {0, 1, 2, 3} and another CSI-RS configuration may be configured with an RE corresponding to CSI-RS antenna port {4, 5, 6, 7}.

The disadvantages of the existing IRR operation can be solved if the UE may preferentially accurately estimate the interference channel. If the UE performs accurately estimates the interference channel via a separate procedure before performing channel estimation of the PDSCH using the DM-RS, reception beamforming is performed in a direction capable of avoiding the interference signal to perform channel estimation of the PDSCH, thereby reducing influence of interference on channel estimation of the PDSCH. In addition, if the interference channel may be estimated regardless of influence on the remaining components from the DM-RS via the separate procedure, it is possible to more accurately perform IRR operation.

Accordingly, in the present invention, a UE estimates an interference channel via a separately indicated RE and performs IRR operation based on the estimated interference channel. The separately indicated RE may mean an RE which is not used as a DM-RS of the PDSCH transmitted to the UE at a specific time.

In order to increase interference channel measurement accuracy, since the separately indicated RE should only be used to measure interference from the neighboring TP, the TP for transmitting the PDSCH preferably does not transmit any signal on that RE. That is, the separately indicated RE becomes a muting RE from the viewpoint of the TP for transmitting the PDSCH and may be regarded as a zero power RE. The separately indicated RE may be referred to as an interference channel estimation RE and may also be referred to as a demodulation interference measurement (DM-IM) RE because the separately indicated RE is used to measure interference to be used for demodulation of the PDSCH.

In general, a TP causing interference may also perform muting even on an RE set to a muting RE by a specific TP. In this case, a signal component of the interference TP does not appear on the muting RE but a signal component of the interference TP appears on the PDSCH, such that the interference channel measured at an arbitrary muting RE is not equal to interference of the PDSCH. In particular, since the interference TP may perform RE muting for the purpose of protecting a specific signal such as a CSI-RS of a third neighboring TP, it is not preferable for the UE to perform interference measurement for IRR on an arbitrary muting RE.

Accordingly, an eNB may signal a specific RE to a UE as an interference channel estimation RE or DM-IM RE via a specific control signal and provide information indicating that interference measured at the indicated RE is equal to interference of the PDSCH transmitted to the UE. The UE, which has received such information, may estimate an interference channel via the indicated RE and perform the above-described IRR operation based on the estimated interference channel and the PDSCH transmission TP may perform muting on the indicated RE. The interference signal of the PDSCH and the signal of the indicated RE may be regarded as being transmitted from the same TP.

Hereinafter, a method for deciding the location of an interference channel estimation RE or DM-IM RE (hereinafter, referred to as DM-IM) for IRR will be described in greater detail. Although the location of the DM-IM RE appears in the form of the location of an existing CSI-RS RE or DM-RS RE, the present invention is not limited thereto and is applicable to the case in which a DM-IM RE exists at an arbitrary location.

First Embodiment

First, the case in which a DM-IM RE is implemented in the form of a CSI-RS RE will be described.

In a first embodiment of the present invention, an eNB may designate one CSI-RS configuration with respect to a UE and inform the UE that interference measured at an RE of the CSI-RS configuration is equal to interference of a PDSCH. Preferably, the CSI-RS configuration designated as the DM-IM RE is configured as a zero power CSI-RS. For convenience of operation, the number of antenna ports of the CSI-RS configuration configured as the DM-IM RE, that is, the number of REs, may be fixed and, for example, the DM-IM RE may be designated in 4-antenna-port CSI-RS configuration units.

In addition, the eNB may inform the UE of which CSI-RS RE is valid as a DM-IM RE via a higher layer signal such as RRC. That is, the eNB may pre-designate a specific CSI-RS configuration via a higher layer signal and inform the UE that the interference channel estimated at an RE of the CSI-RS configuration is equal to interference of the PDSCH transmitted to the UE.

In general, the CSI-RS does not appear in every subframe but appears only in some subframes at specific periods as shown in Table 3. Therefore, on a certain subframe, the UE may receive the PDSCH but a DM-IM RE may not exist. In this case, the UE operates as follows.

First, assume that the UE may measure the same interference channel as interference of the PDSCH only on a subframe in which the CSI-RS configuration designated as the DM-IM RE appears. That is, if the CSI-RS configuration designated as the DM-IM RE does not appear on a specific subframe, the UE omits an interference channel estimation process via a DM-IM RE on the specific subframe and receives the PDSCH. Such operation has a disadvantage in that the proposed IRR operation is restricted to some subframes, but can reduce scheduling restriction of a network by performing the proposed method only when interference channel estimation via the designated CSI-RS configuration is ensured.

Alternatively, the UE may estimate an interference channel using an interference channel estimate at the designated DM-IM RE appearing in another subframe on a subframe in which the CSI-RS configuration designated as the DM-IM RE does not appear and perform the above-described IRR operation. For example, the UE may perform interpolation with respect to the interference channel based on the estimate at the CSI-RS configuration designated as the DM-IM RE to estimate the interference channel at the subframe in which the CSI-RS configuration designated as the DM-IM RE does not appear. This method is advantageous in that the IRR operation may be performed in every subframe. If an interference TP performs a different type of beamforming on a subframe in which the CSI-RS configuration designated as the DM-IM RE does not appear, the interference direction assumed by the UE and the actual interference direction of the PDSCH become different such that the IRR operation is not accurately performed. Therefore, the interference TP should perform beamforming of the same direction as the CSI-RS configuration designated as the DM-IM RE on all subframes. In order to mitigate this problem, the eNB may inform the UE of a set of subframes and/or physical resource blocks (PRBs) and the fact that the interference channel measured at the CSI-RS configuration designated as the DM-IM RE is equal to the interference channel of the PDSCH. In addition, the eNB may pre-inform the UE of on which subframe/PRB beamforming is performed in the same direction as a certain DM-IM RE via a backhaul link between TPs.

The eNB may inform the UE of which CSI-RS configuration is valid as a DM-IM RE via a physical layer control signal such as a PDCCH or an enhanced PDCCH (EPDCCH). Here, the EPDCCH is introduced as a new control channel in order to apply a MIMO scheme and an inter-cell cooperative communication scheme to a multi-node environment. In particular, the EPDCCH is allocated to a data region (or a PDSCH region) instead of an existing control region (or a PDCCH region) and is transmitted and received based on a DM-RS (or a CSI-RS) instead of a CRS which is a specific reference signal of an existing cell. In validity of a DM-IM RE, the eNB may pre-inform the UE of a plurality of CSI-RS configurations as DM-IM RE candidates via a higher layer signal such as RRC and then signal information indicating that an interference channel measure of a certain CSI-RS configuration among the DM-IM candidates is equal to an actual interference channel of the PDSCH via a physical layer control signal. In particular, a state indicating "the same interference feature as the interference channel measure of a certain CSI-RS configuration may not be assumed" may exist in the signaling information and may be used when it is difficult to configure an appropriate DM-IM RE in a network.

Presence/absence of the DM-IM RE may be defined in the UE using one of a) to c).

a) First, presence/absence of the DM-IM RE may be determined in a semi-static manner. That is, presence/absence of the DM-IM RE in every subframe is pre-specified according to parameters such as periodicity or subframe offset provided via a higher layer signal such as RRC. Presence/absence of the DM-IM RE is determined via a higher layer signal but which of several CSI-RS configurations corresponds to the DM-IM RE may be regarded as being additionally determined via a physical layer signal.

Accordingly, presence/absence of the DM-IM RE is not related to the physical layer control signal in every subframe. Even when a specific DM-IM RE candidate is not designated as a valid DM-IM RE by a physical layer signal, a CSI-RS configuration corresponding to the DM-IM RE still exists in the subframe and the UE assumes that the PDSCH is not mapped to the RE of the CSI-RS configuration.

Figure 13:
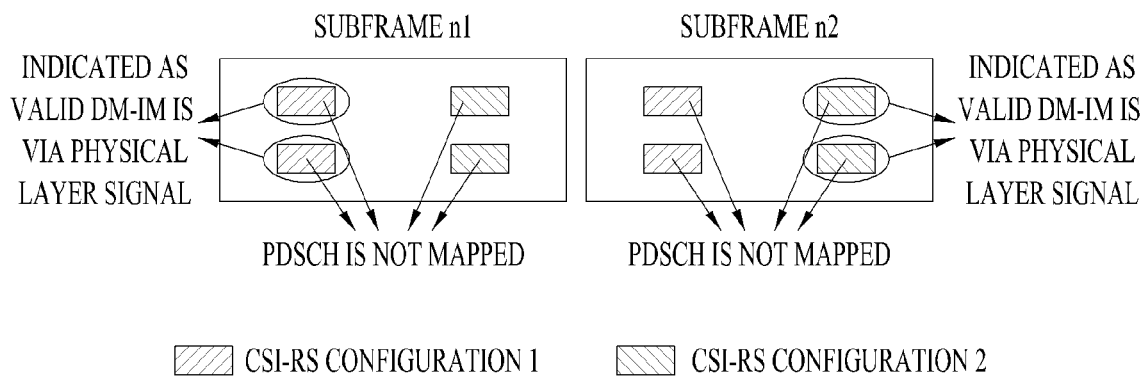
FIG. 13 is a diagram showing an example of indicating a DM-IM RE according to a first embodiment of the present invention.

FIG. 13 is a diagram showing an example of indicating a DM-IM RE according to a first embodiment of the present invention.

Referring to FIG. 13, CSI-RS configuration 1 and CSI-RS configuration 2 are designated at subframe n1 and subframe n2. Via a physical layer signal, CSI-RS configuration 1 is indicated as a valid DM-IM RE at subframe n1 and CSI-RS configuration 2 is indicated as a valid DM-IM RE at subframe n2.

The UE performs IRR operation using the CSI-RS configuration designated as the valid DM-IM RE on each subframe according to such indication. However, the PDSCH may be regarded as being not mapped to the pre-designated CSI-RS configurations regardless of the indication of validity.

b) Alternatively, presence/absence of the DM-IM RE may be dynamically determined in every subframe by a physical layer signal. That is, the potential location of each DM-IM RE, for example, the potential location of the DM-IM RE in the every subframe is given as a plurality of CSI-RS configurations via a higher layer signal but an actual valid DM-IM RE appears at the corresponding subframe only when being designated via a physical layer signal and, otherwise, does not appear at the corresponding subframe. That is, if the CSI-RS configuration is not designated as the valid DM-IM RE via the physical layer signal, the PDSCH is mapped to the RE of the CSI-RS configuration.

Of course, even when a specific CSI-RS configuration is not designated as a valid DM-IM RE at a specific subframe, if a different type of CSI-RS configuration which is designated to be present in a semi-static manner at the same location as the corresponding subframe, the PDSCH should not be mapped. A PRB in which a valid DM-IM RE appears may be restricted to a PRB to which the PDSCH of the UE is mapped. Even when a specific CSI-RS configuration is designated as a valid DM-IM RE, the muting operation of the corresponding RE is performed only in a region, to which the PDSCH of the UE is mapped, and is not performed in the other PRBs. Therefore, the interference channel estimation operation may be interpreted as being prohibited in the RE of the region to which the PDSCH is not mapped.

Figure 14:
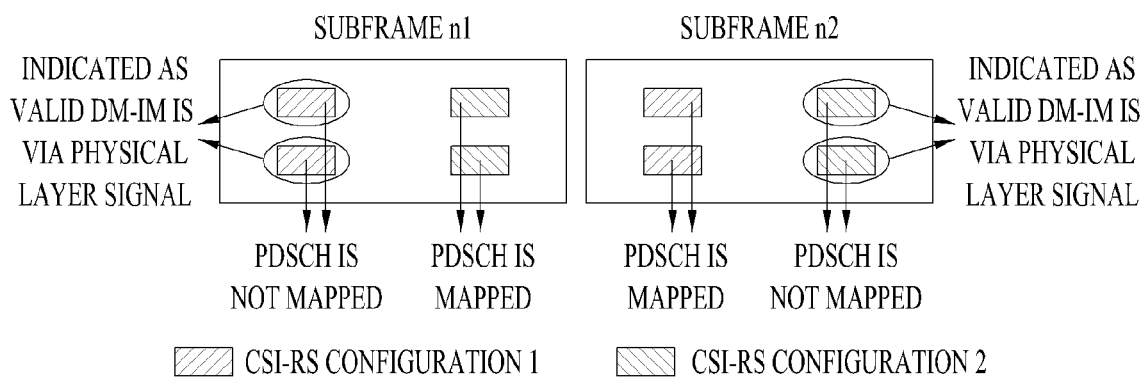
FIG. 14 is a diagram showing another example of indicating a DM-IM RE according to a first embodiment of the present invention.

FIG. 14 is a diagram showing another example of indicating a DM-IM RE according to a first embodiment of the present invention.

Referring to FIG. 14, CSI-RS configuration 1 and CSI-RS 2 are designated at subframe n1 and subframe n2. Via a physical layer signal, CSI-RS configuration 1 is indicated as a valid DM-IM RE at subframe n1 and CSI-RS configuration 2 is indicated as a valid DM-IM RE at subframe n2.

The UE performs IRR operation based on the valid DM-IM RE at each subframe according to this indication and regards PDSCH mapping as not being performed only in the CSI-RS configuration designated as the valid DM-IM RE at the corresponding subframe. That is, the PDSCH is mapped to REs corresponding to DM-IM configurations which are not designated as the valid DM-IM at a specific subframe, e.g., CSI-RS configuration 1 of subframe n1 and CSI-RS configuration 2 of subframe n2 unless separate signaling is provided.

c) Lastly, a method of automatically pre-designating a specific CSI-RS configuration as a valid DM-IM RE when a specific PDSCH scheduling message is received may be considered. In this method, a specific CSI-RS configuration is pre-connected to a PDSCH scheduling message of a specific condition via a higher layer signal such as RRC and is assumed as a valid DM-IM RE when a PDSCH scheduling message satisfying the condition is received and IRR is performed. If the CSI-RS configuration is valid, the PDSCH is not mapped to the CSI-RS configuration.

The condition of the specific PDSCH scheduling message may include a scheduling message having a specific DCI format, e.g., a DCI format used only in a transmission mode capable of performing IRR operation, a scheduling message transmitted on a specific subframe, e.g., a subframe included in a set of subframes designated by a higher layer signal, and a combination thereof.

When the UE receives scheduling messages except for the specific PDSCH scheduling message, the CSI-RS configuration is regarded as being invalid and the PDSCH is regarded as being mapped to the corresponding RE. As an extension thereof, a plurality of conditions for a PDSCH scheduling message may be pre-delivered to the UE, a specific CSI-RS configuration may be regarded as being valid if condition 1 is satisfied and another specific CSI-RS configuration may be regarded as being valid if condition 2 is satisfied.

If the valid DM-IM RE is indicated using a physical layer control signal in a) and b), (1) a new bit field may be added to the physical layer control signal and (2) an RE may be linked to a parameter for deciding an initial value of a DM-RS scrambling sequence, for information indicating the valid DM-IM RE. More specifically, a DCI format scheduling a PDSCH includes a bit field indicating a parameter such as n_SCID used to decide the initial value of the DM-RS scrambling sequence, a CSI-RS configuration corresponding to a valid DM-IM RE is allocated to each state designated by this bit field one by one, and an RE linked to the parameter state is regarded as a valid DM-IM RE when a specific parameter is actually selected from DCI.

Alternatively, for information indicating a valid DM-IM RE, (3) an RE may be linked to a parameter for deciding an RE mapping pattern of a PDSCH or an ID of a PDSCH transmission cell. Similarly to 2) if a bit field for a parameter for deciding an RE mapping pattern of a PDSCH or an ID of a PDSCH transmission cell is included in a DCI format scheduling a PDSCH, a CSI-RS configuration corresponding to the valid DM-IM RE may be allocated to each state designated by this bit field one by one.

Lastly, for information indicating a valid DM-IM RE, (4) an RE may be linked to a parameter for deciding a HARQ process ID. That is, using a HARQ process ID field included in a DCI format scheduling a PDSCH, a CSI-RS configuration corresponding to the valid DM-IM RE may be allocated to each state designated by this bit field one by one.

Additionally, in order to prevent excessively many types of CSI-RS configurations from being configured for one UE, a DM-IM RE may be restricted to one of CSI-RS configurations configured for the UE as CSI-IM which is an interference measurement resource used for CSI feedback. Since the UE should perform at least interference channel estimation for the CSI-RS configuration configured as CSI-IM for CSI feedback, if such restriction is applied, interference channel estimation operation for IRR does not need to be separately performed.

Second Embodiment

Next, the case of implementing a DM-IM RE in the form of a DM-RS will be described. More specifically, the eNB may assign a DM-RS of a specific antenna port to the UE and indicate that interference measured at the RE of the DM-RS is regarded as being the same as interference of the PDSCH.

In general, since the above-described IRR operation is efficient when most UEs are located at an edge of a TP and thus a signal to interference plus noise ratio (SINR) is relatively low, rank of the PDSCH is set to a relatively low value such as 1 or 2. If rank of the PDSCH is low, the number of REs used by the DM-RS may be reduced. Even in a 3GPP LTE system, when rank is 1 or 2, 12 REs of a PRB pair are used as DM-RSs and, if rank is greater than 2, 24 REs are used as DM-RSs.

Using the structure of the DM-RS, if a DM-IM configuration is necessary, the eNB transmits DM-RSs using 12 REs if rank of the PDSCH is 1 or 2 and uses the 12 DM-RS REs other than REs used as DM-RSs as DM-IM without transmitting the PDSCH if rank of the PDSCH is greater than 2. That is, the eNB may inform the UE that a null RE is transmitted on 12 DM-RS REs other than 12 REs containing DM-RSs used for actual PDSCH demodulation via predetermined signaling and the UE may perform IRR operation using the null RE as a DM-IM RE. Such signaling may be transmitted to the UE via a higher layer signal such as RRC and may be valid only in a series of designated subframes and/or PRBs similarly to the first embodiment.

Alternatively, such indication may be delivered to the UE via a physical layer control signal such as a PDCCH/EPDCCH to indicate whether a DM-IM RE of a DM-RS RE form is included in the corresponding subframe. More specifically, A) to E) may be implemented.

A) First, a new bit field may be added to a physical layer control signal and whether a DM-IM RE of a DM-RS RE form is included in a subframe may be indicated via the added bit field. Of course, if such a bit field is not included and rank is equal to or less than 2, the PDSCH is mapped to the REs other than DM-RSs of 12 REs. If such a bit field is included, even when rank is equal to or less than 2, the PDSCH is not mapped to DM-RSs of 24 REs.

Figure 15:
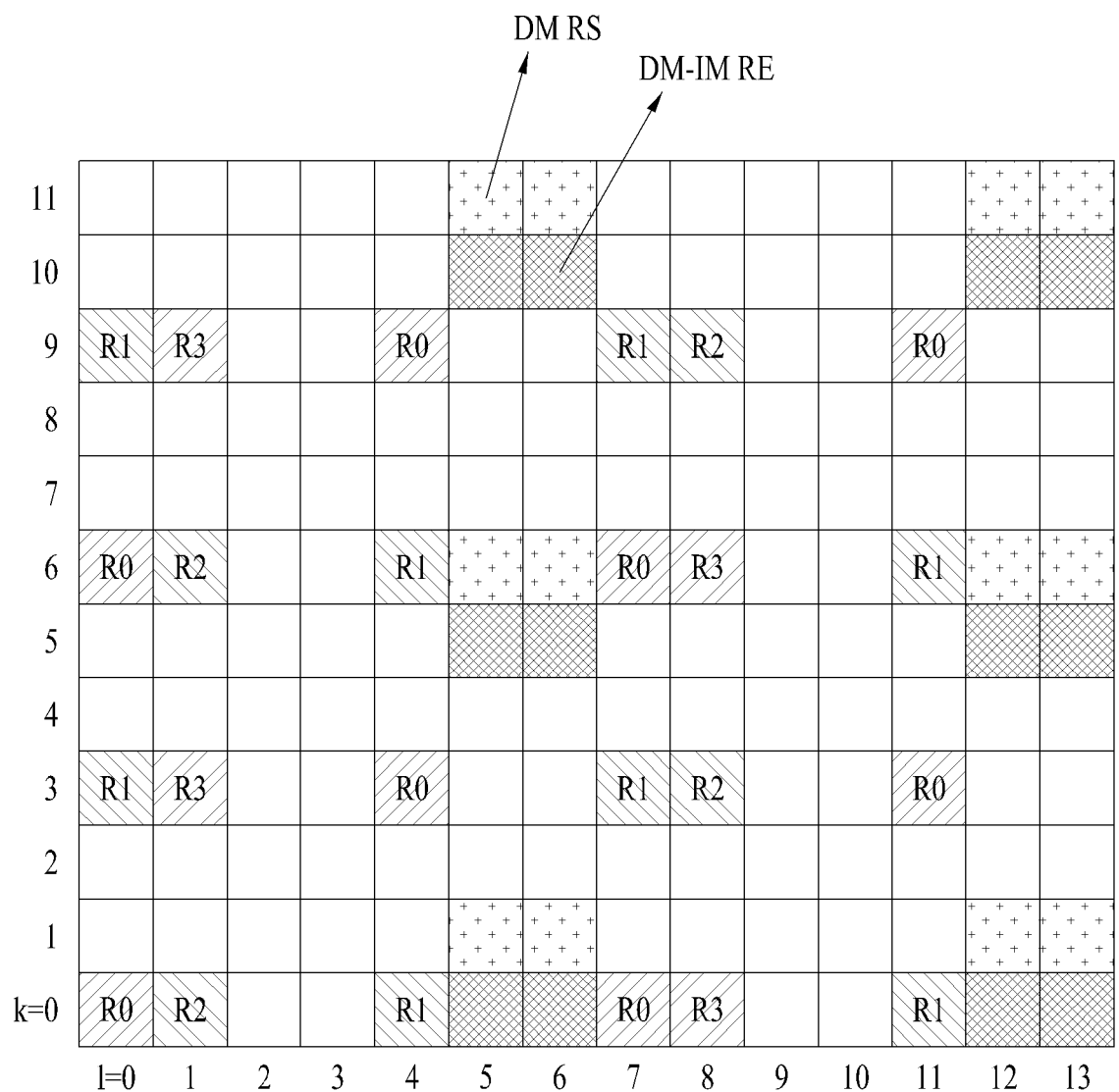
FIG. 15 is a diagram showing an example of configuring a DM-IM RE according to a second embodiment of the present invention.

FIG. 15 is a diagram showing an example of configuring a DM-IM RE according to a second embodiment of the present invention.

Referring to FIG. 15, in one PRB pair, DM-RSs for a first layer and/or a second layer are transmitted via 12 REs and the remaining 12 REs are used as DM-IM REs in a state in which the PDSCH is not mapped. If rank is equal to or greater than 3, since DM-RSs of 24 REs are always used, it may always be assumed that a valid DM-IM RE is not present.

If MU-MIMO is performed using DM-RSs located at different REs, since whether DM-RSs for another UE are present should be indicated, an indicator indicating the number of DM-RS REs may already be included in a DCI format scheduling a PDSCH. In this case, the added bit field may be used to indicate whether a DM-RS RE which is not used for the PDSCH of the UE is a valid DM-IM RE or whether a DM-RS RE which is not used for the PDSCH of the UE is a null RE, if DM-RSs are present in all 24 REs. That is, via the added bit field, whether DM-RSs of another UE are transmitted on the DM-RS RE other than the DM-RS for the PDSCH of the UE or a null RE is configured such that interference channel estimation is possible is indicated. In particular, this bit field may indicate whether interference measured at the null RE is equal to interference of the RE to which a normal PDSCH is mapped and whether IRR operation is performed based on interference of the null RE.

In addition, in interference channel estimation via the DM-IM RE, if a DM-RS of an interference signal is transmitted and has power higher than that of an interference signal, the eNB may additionally inform the UE of a ratio of the power of the DM-RS of the interference signal to the power of the interference signal. Accordingly, the UE may operate to derive receive power of the interference signal from receive power of the DM-RS of the interference signal and the UE may perform appropriate interference avoidance reception operation based on the receive power.

B) Information indicating whether a DM-IM RE of a DM-RS RE form is present via a physical layer control signal may be linked to a parameter for deciding an initial value of a DM-RS scrambling sequence. That is, as described above, since a bit field indicating a parameter used to decide the initial value of the DM-RS scrambling sequence, such as n_SCID, is included in DCI scheduling the PDSCH, presence/absence of the DM-IM RE corresponds to each state indicated by this bit field.

C) In addition, information indicating whether a DM-IM RE of a DM-RS RE form is present via a physical layer control signal may be linked to a parameter for deciding an RE mapping pattern of a PDSCH or an ID of a PDSCH transmission cell. Similarly to B), if a bit field for the parameter for the RE mapping pattern of the PDSCH or the ID of the PDSCH transmission cell is present in DCI scheduling the PDSCH, presence/absence of the DM-IM RE may correspond to each state indicated by this bit field.

D) Further, information indicating whether a DM-IM RE of a DM-RS RE form is present via a physical layer control signal may be linked to a parameter for deciding a HARQ process ID. That is, if a bit field of the HARQ process ID present in DCI scheduling the PDSCH is present, presence/absence of the DM-IM RE corresponds to each state indicated by this bit field.

E) Lastly, when a specific PDSCH scheduling message is received, as shown in FIG. 15, a method of automatically pre-designating a DM-RS RE for a specific antenna port as a valid DM-IM RE may be considered. In this method, a condition of a scheduling message of a specific PDSCH is pre-designated via a higher layer signal such as RRC, the DM-IM RE is assumed to be a valid RE if a PDSCH scheduling message satisfying the condition is received, and IRR is performed.

The condition of the specific PDSCH scheduling message may include a scheduling message having a specific DCI format, e.g., a DCI format used only in a transmission mode capable of performing IRR operation, a scheduling message transmitted on a specific subframe, e.g., a subframe included in a set of subframes designated by a higher layer signal, and a combination thereof. When the UE receives scheduling messages except for the specific PDSCH scheduling message, the DM-IM configuration is regarded as being invalid and the PDSCH is regarded as being mapped to the corresponding RE.

As an extension thereof, a plurality of conditions for a PDSCH scheduling message may be pre-delivered to the UE, a specific DM-IM RE may be regarded as being valid if condition 1 is satisfied and another specific DM-IM RE may be regarded as being valid if condition 2 is satisfied.

The locations of the DM-RS and the DM-IM RE shown in FIG. 15 may be adjusted by the ID of a UE or the ID of a cell or TP, the index of a subframe or a PRB pair on which a signal is transmitted, various parameters such as a DM-RS scrambling sequence of a PDSCH/EPDCCH or an explicit indicator delivered via a physical layer signal or a higher layer signal. Operation for appropriately adjusting the locations of the DM-RS and the DM-IM RE can avoid inter-cell interference between the DM-RS and the DM-IM RE.

That is, two cells located at mutual interference locations may use DM-RSs located at different locations to prevent interference between DM-RSs. In particular, since the DM-RS is used for channel estimation, if interference between cells/TPs is avoided, it is possible to improve performance via more stable channel estimation. In this case, a cell/TP which performs DM-RS interference avoidance operation may configure an RE, which is used by a neighboring cell/TP as a DM-RS, as a null RE to prevent interference to the DM-RS of the neighboring cell/TP and configure the null RE as a DM-IM RE to measure interference of the neighboring cell/TP, thereby performing interference avoidance reception operation.

FIG. 16 is a diagram showing an example of configuring different DM-RS RE and DM-IM RE configurations in a plurality of cells according to a second embodiment of the present invention.

Referring to FIG. 16, the DM-RS and the DM-IM RE are configured at different locations in a cell 1 and a cell 2. In particular, in one cell, the location of the DM-RS corresponds to the null RE of the neighboring cell, that is, the DM-IM RE. Via such a configuration, each cell/TP can protect the DM-RS thereof from interference of the neighboring cell and more accurately perform interference measurement.

As described above, when the DM-RS and the DM-IM RE are configured at different locations in the neighboring cell/TP, interference between cells/TPs is efficiently controlled. However, it is difficult for all neighboring cells/TPs to use orthogonal DM-RSs and DM-IM REs. Use of orthogonal DM-RSs means that a neighboring cell causing interference configures an RE, which is configured by one cell as a DM-RS, as a null RE to avoid interference to the DM-RS. Similarly, use of orthogonal DM-IM means that a neighboring cell causing interference configures an RE, which is configured by one cell as a DM-RS, as a DM-RS RE to facilitate interference measurement via DM-IM. The configuration of the orthogonal DM-RS or DM-IM RE requires a complicated cell/TP configuration process. In particular, it is difficult to apply the complicated cell/TP configuration process to a hot spot in which a large number of transmission nodes exists.

This problem may be solved by randomizing the DM-RS and DM-IM RE configurations according to cell/TP. That is, each cell/TP may randomly set the location of the DM-RS or DM-IM RE according to a unique pattern, such that collision with the DM-RS is avoided at a plurality of locations although orthogonality with a neighboring cell/TP is not completely achieved, thereby acquiring interference avoidance (interference measurement via DM-IM) to the DM-RS. In particular, if CoMP operation for receiving a signal from a plurality of cells/TPs is performed, since a specific UE may access several cells/TPs, the location of the DM-RS or DM-IM RE may be UE-specifically designated. Operation for changing the location of the DM-RS and the DM-IM RE may be expressed by hopping of the DM-RS and DM-IM RE, as compared to use of a fixed location as shown in FIG. 15.

Figure 17:
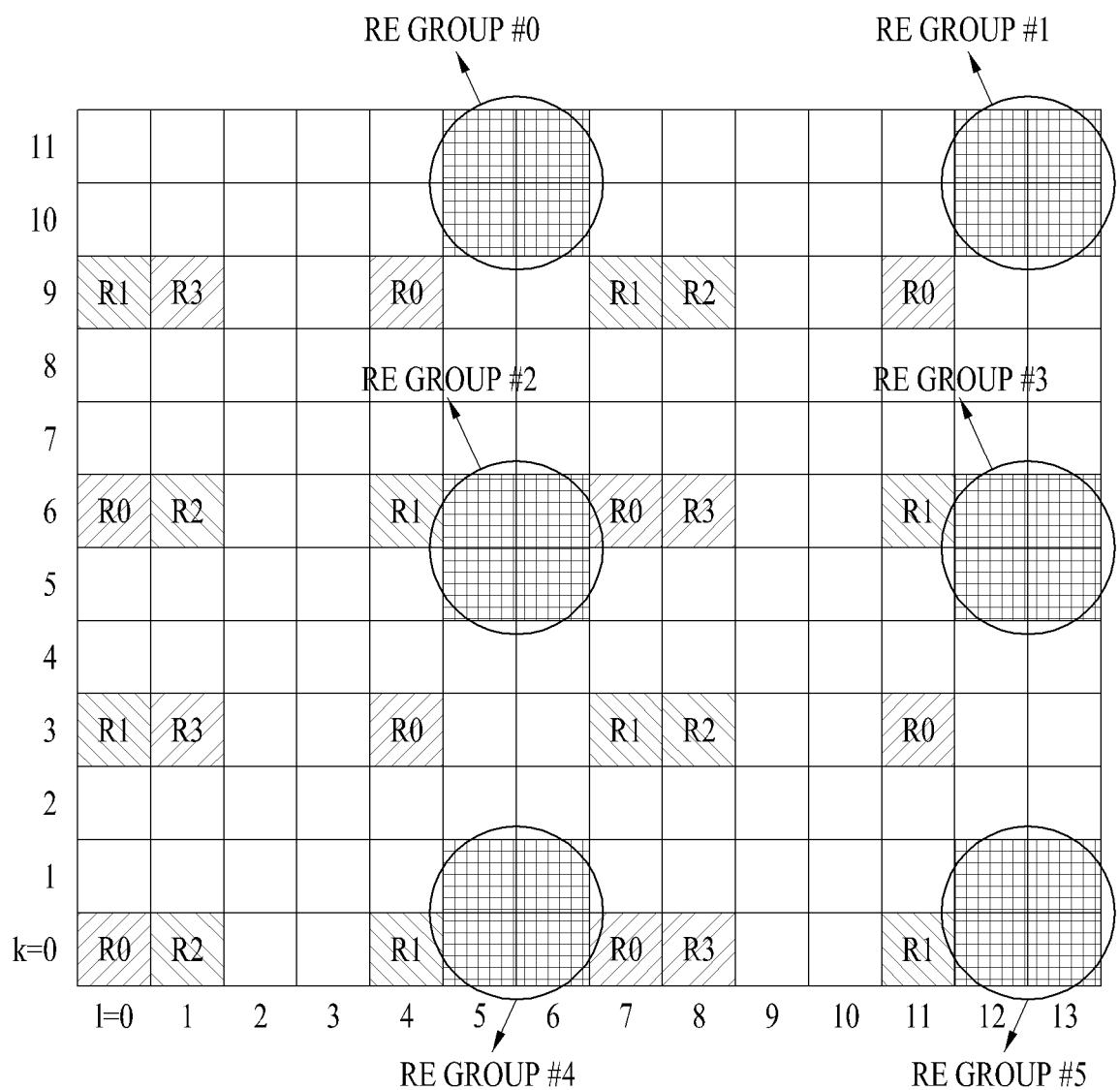
FIGS. 17 and 18 are diagrams showing hopping operation of DM-RS and DM-IM REs according to a second embodiment of the present invention.
Figure 18:
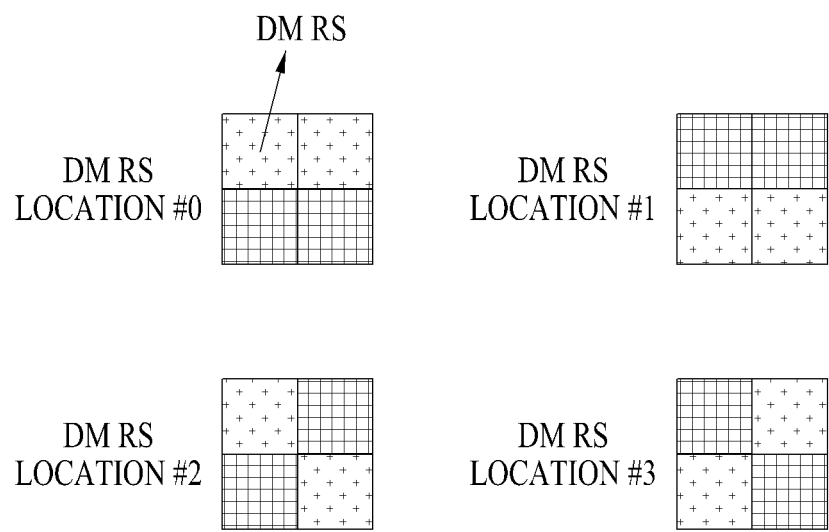

FIGS. 17 and 18 are diagram showings hopping operation of DM-RS and DM-IM RE according to a second embodiment of the present invention. In particular, FIGS. 17 and 18 show examples of grouping adjacent REs to one group.

First, referring to FIG. 17, within one PRB pair, a total of six groups is established. In each group, the location of an RE occupied by a DM-RS or DM-IM is changed according to various parameters to implement hopping operation of DM-RS or DM-IM RE.

FIG. 18 shows DM-RS locations possible within one RE group and hopping of the DM-RS may be implemented by selecting different DM-RS RE locations according to RE group. Of course, only some of the DM-RS RE locations shown in FIG. 18 may be used. In FIG. 18, an RE which is not used as a DM-RS within one group may be configured as a null RE, to which a PDSCH is not mapped, or may be configured as a DM-IM RE.

Figure 19:
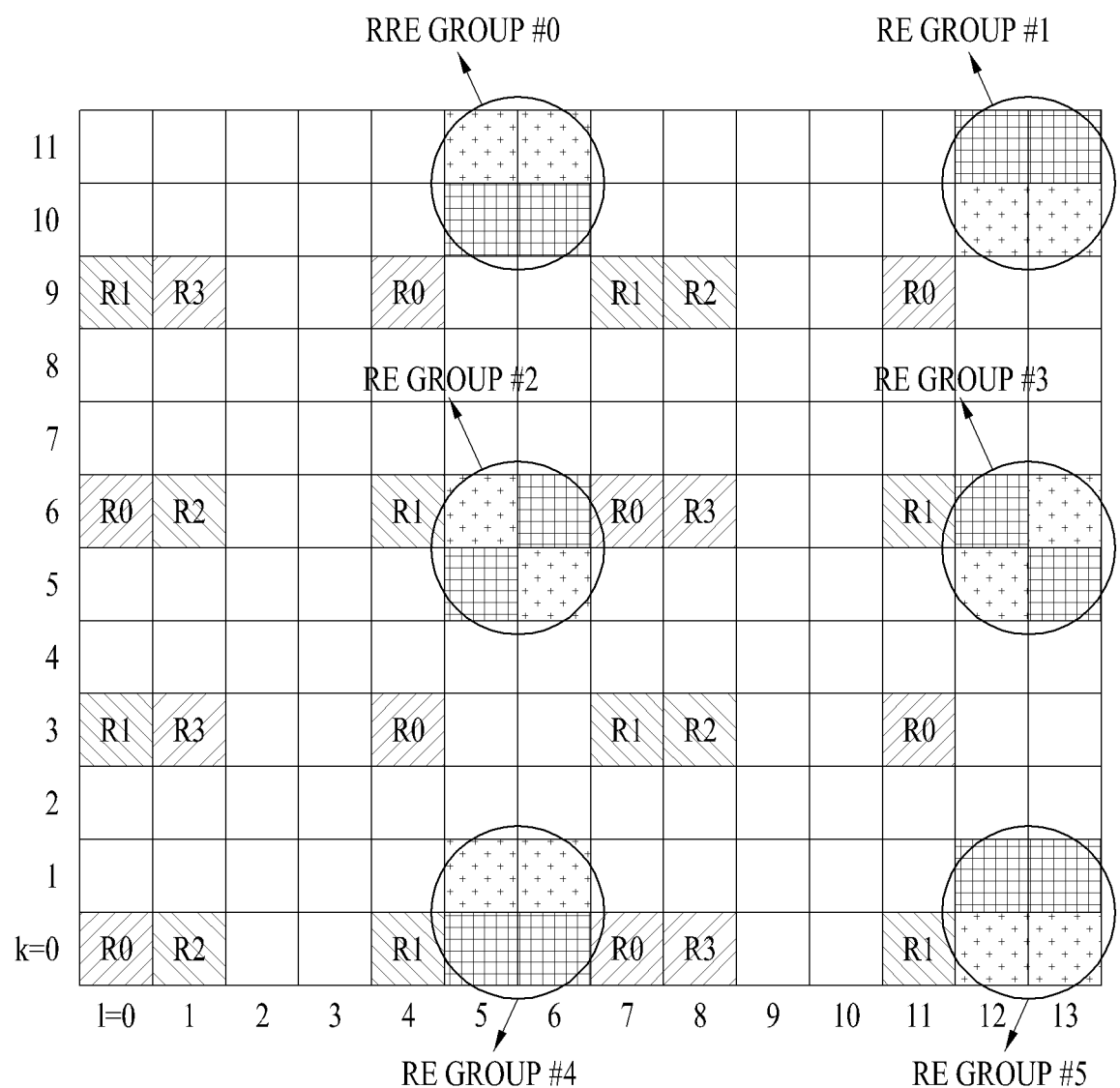
FIG. 19 is a diagram showing an example of implementing DM-RS hopping within one PRB pair using a DM-RS location of FIG. 18.

FIG. 19 is a diagram showing an example of implementing DM-RS hopping within one PRB pair using a DM-RS location of FIG. 18.

Referring to FIG. 19, DM-RS locations #0, #1, #2, #3, #0 and #1 are applied to RE group #0 to RE group #5, respectively. Such a DM-RS hopping pattern may enable the same pattern to be repeated in all PRB pairs or enable different patterns to appear in different PRB pairs. In the latter case, the DM-RS hopping pattern is determined by the index of the PRB pair. In order to prevent channel estimation of the UE from becoming excessively complicated due to simultaneous appearance of excessively various patterns, the same hopping pattern may be repeated in group units of a series of PRB pairs.

In addition, in order to equally maintain channel estimation operation within one PRB pair, one of the DM-RS locations of FIG. 18 repeatedly appears within one PRB pair. When the PRB pair is changed, a DM-RS hopping pattern may be defined to change the DM-RS location.

Additionally, if DM-RS overhead is changed according to the communication state of the UE and, more specifically, if the UE may appropriately operate only using a smaller number of DM-RSs in a more stable channel state, the DM-RS and DM-IM are transmitted on only some of the RE groups shown in FIG. 17. This means that the remaining RE groups are used as the PDSCH. Of course, the location of the RE group may be moved according to the communication state of the UE.

In addition to DM-RS hopping, the scrambling sequence or spreading code of the DM-RS used in each RE group hops with a constant pattern, thereby further increasing randomization effect. If only DM-RS location #0 and DM-RS location #1 shown in FIG. 18 is restrictively used, the used DM-RS antenna port may be interpreted to be changed according to RE group. More specifically, since DM-RS location #0 and DM-RS location #1 respectively correspond to antenna ports 7 (or 8) and 9 (or 10), even when the PDSCH is mapped to antenna port 7(or 8) upon rank 1 transmission, the DM-RS is used while hopping between antenna port 7(or 8) and 9 (or 10) according to RE group.

Figure 20:
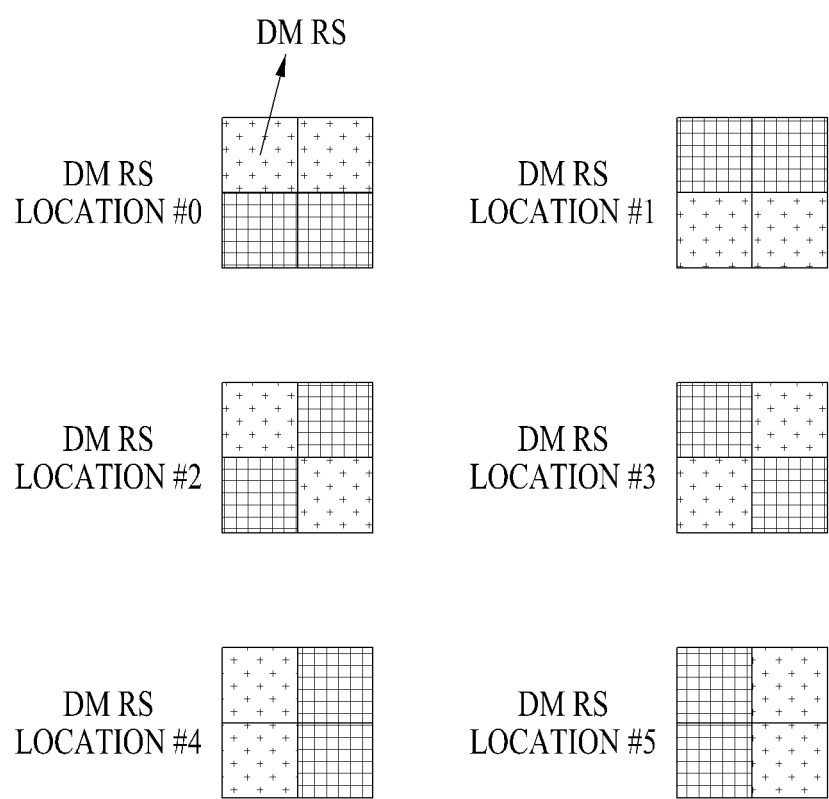
FIG. 20 is a diagram showing another example of a DM-RS location according to a second embodiment of the present invention.

FIG. 20 is a diagram showing another example of a DM-RS location according to a second embodiment of the present invention. In particular, in FIG. 20, DM-RS location #4 and DM-RS location #5 are added to the DM-RS locations shown in FIG. 18.

In FIG. 20, assume that the DM-RS of each antenna port uses an orthogonal cover code (OCC) and are spread over two Res. The spreading direction is changed according to the location of the RE. More specifically, in the case of DM-RS location #0 and DM-RS location #1, an existing DM-RS structure which is spread at the same subcarrier in a time direction is used without change. However, DM-RS location #2 and DM-RS location #3 are spread in the time direction and a signal corresponding to a second component of the OCC is transmitted by changing the location of the subcarrier. Lastly, DM-RS location #4 and DM-RS location #5 are spread in a frequency region while using the same OFDM symbol.

The location and hopping pattern of the DM-RS or DM-IM RE may be pre-designated in a semi-static manner via a higher layer signal such as RRC or may be dynamically designated via a physical layer signal such as a PDCCH/EPDCCH. Here, hopping of the DM-RS or DM-IM RE may be activated/deactivated under control of the eNB. If hopping of the DM-RS or DM-IM RE is deactivated, one of the locations shown in FIG. 20 is used for all DM-RS RE groups. In particular, if the location and hopping pattern of the DM-RS or DM-IM RE is designated via a physical layer signal, the location and hopping pattern of the DM-RS or DM-IM RE used by the PDSCH may be interpreted as being designated via DCI.

If the UE is performing dynamic point selection (DPS) operation for receiving the PDSCH from one of a plurality of TPs, different locations and hopping patterns of the DM-RS or DM-IM RE may be used depending on which TP performs transmission, that is, a CRS pattern of which cell is used to map the PDSCH or QCL with which CRS/CSI-RS is possible. That is, the location or hopping pattern of the DM-RS or DM-IM RE to be used when the state is designated may be pre-allocated to each state indicated by the indicator indicating which TP transmits the PDSCH.

Third Embodiment

If the DM-IM RE is configured by the above-described methods, the UE may estimate the interference channel via the DM-IM RE. If the same precoding is applied to a series of consecutive PRB pairs in a neighboring cell/TP and interference channel estimation is performed using the DM-IM REs of the series of consecutive PRB pairs, it is possible to further increase accuracy of the interference channel estimate. This may be called PRB bundling in interference channel estimation.

However, since this operation is applicable only when the same precoding is applied to a series of PRB pairs, the eNB may inform the UE of whether the neighboring cell applies the same precoding to a series of PRB pairs via a higher layer signal such as RRC. That is, the eNB may inform the UE of whether PRB bundling in interference channel estimation is possible.

Alternatively, this operation may be linked to PRB bundling of the PDSCH transmitted to the UE. When PRB bundling is possible in channel estimation of the PDSCH transmitted to the UE, it is assumed that PRB bundling in interference channel estimation is possible.

Additionally, if the DM-IM RE is configured and the interference channel is estimated via the DM-IM RE, the UE may perform channel estimation with respect to the cell/TP for transmitting the PDSCH and the interference cell/TP. In this case, the eNB may pre-designate a predetermined reference signal used for interference channel estimation for the DM-IM and inform the UE that the interference channel has the same attributes as the predetermined reference signal with respect to a specific channel estimation parameter. If such information is provided, the UE may stably acquire some channel estimation parameters from the predetermined reference signal and estimate the interference channel based on the channel estimation parameters, thereby acquiring further improved interference channel estimation performance.

In order to enable one UE to perform CoMP operation for receiving the PDSCH from a plurality of cells/TPs, the eNB may designate a reference signal capable of deriving some channel estimation parameters when the UE performs channel estimation of the PDSCH. For example, the eNB links a DM-RS of a specific time to a specific CRS in a QCL relationship and informs the UE of information indicating that Doppler shift or Doppler spread measured from the linked CRS is equally applied to the DM-RS. Alternatively, the eNB may link a DM-RS of a specific time to a specific CSI-RS in a QCL relationship and inform the UE of information indicating that Doppler shift, Doppler spread, average delay or delay spread measured from the linked CSI-RS is equally applied to the DM-RS.

Accordingly, the present invention proposes designation of a CRS and/or CSI-RS in a QCL relationship with DM-IM of a specific time, for improved interference channel estimation in DM-IM. For example, the eNB may add QCL information available for DM-IM to each state indicated by a bit field of DCI indicating a mapping pattern of a PDSCH and QCL information via a higher layer signal such as RRC and perform interference channel estimation via DM-IM using QCL information linked to the state if a specific state is designated by DCI.

In a state in which QCL information of DM-IM is provided, a scrambling sequence value used by the DM-RS of an interference cell/TP may be further indicated so as to directly measure a DM-RS transmitted by the interference cell/TP.

However, unlike channel estimation of the PDSCH, interference channel estimation is not necessary to improve performance. If cooperation with a neighboring cell is not appropriately performed, that is, if synchronization with the neighboring cell is not appropriately performed, it may be difficult to provide QCL information for DM-IM.

Accordingly, QCL information for DM-IM may not be provided in some cases. Alternatively, only some QCL information, that is, only CRS information in a QCL relationship, may be provided. If QCL information of DM-IM is not provided or is partially provided, instead of direct measurement of the DM-RS of the interference cell/TP, the signal observed at DM-IM is regarded as interference to measure the attributes of interference.

Operation for the DM-RS and DM-IM RE configuration described in the embodiments of the present invention is applicable to a scheme for transmitting a control channel using a DM-RS, such as an EPDCCH, in addition to the PDSCH.

Figure 21:
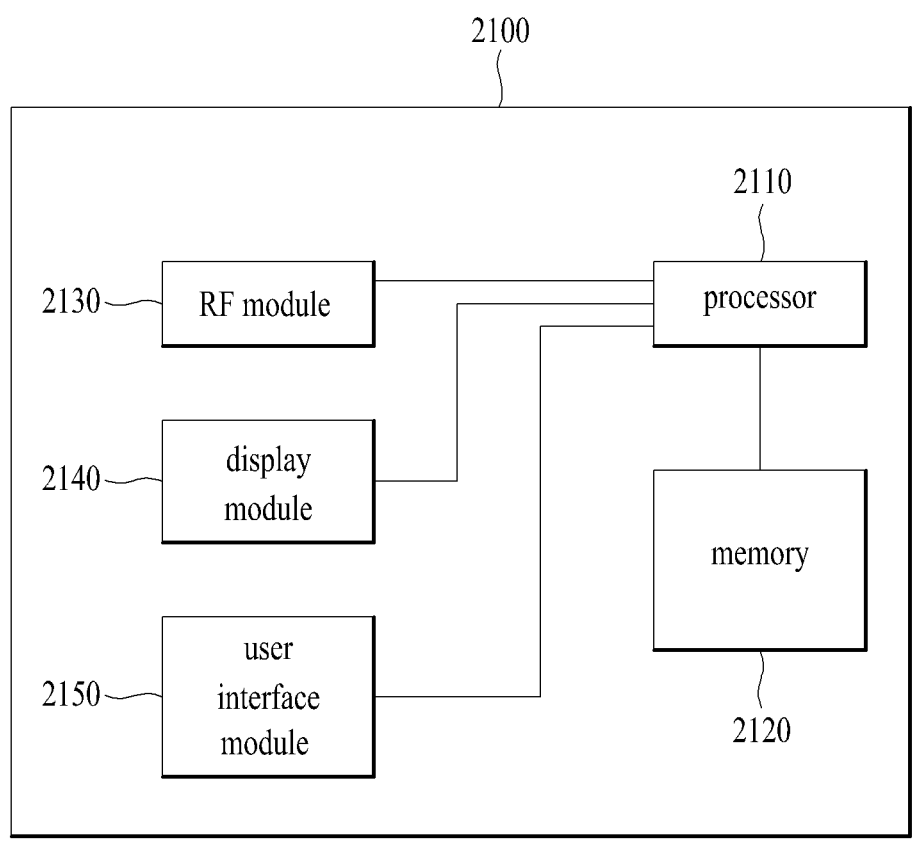
FIG. 21 is a block diagram of a communication apparatus according to an embodiment of the present invention.

FIG. 21 is a block diagram of a communication apparatus according to an embodiment of the present invention.

Referring to FIG. 21, a communication apparatus 2100 includes a processor 2110, a memory 2120, an RF module 2130, a display module 2140, and a User Interface (UI) module 2150.

The communication device 2100 is shown as having the configuration illustrated in FIG. 21, for the convenience of description. Some modules may be added to or omitted from the communication apparatus 2100. In addition, a module of the communication apparatus 2100 may be divided into more modules. The processor 2110 is configured to perform operations according to the embodiments of the present invention described before with reference to the drawings. Specifically, for detailed operations of the processor 2110, the descriptions of FIGS. 1 to 20 may be referred to.

The memory 2120 is connected to the processor 2110 and stores an Operating System (OS), applications, program codes, data, etc. The RF module 2130, which is connected to the processor 2110, upconverts a baseband signal to an RF signal or downconverts an RF signal to a baseband signal. For this purpose, the RF module 2130 performs digital-to-analog conversion, amplification, filtering, and frequency upconversion or performs these processes reversely. The display module 2140 is connected to the processor 2110 and displays various types of information. The display module 2140 may be configured as, not limited to, a known component such as a Liquid Crystal Display (LCD), a Light Emitting Diode (LED) display, and an Organic Light Emitting Diode (OLED) display. The UI module 2150 is connected to the processor 2110 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although an example in which a method and apparatus for receiving a signal using an interference cancellation scheme in a wireless communication system is applied to a 3GPP LTE system has been described, the present invention is applicable to various wireless communication systems in addition to the 3GPP LTE system

The invention claimed is:

1. A method for receiving a downlink signal at a user equipment (UE) from a base station (BS) in a wireless communication system, the method comprising:
   receiving, from the BS, information of a set of subframes and information of a plurality of channel status information-reference signal (CSI-RS) configurations configured for the set of subframes;
   receiving, from the BS, an indication indicating a first CSI-RS configuration among the plurality of CSI-RS configurations;
   estimating, on a first subframe included in the set of subframes, a first interference channel from a neighboring BS using resource elements corresponding to the first CSI-RS configuration;
   receiving, on the first subframe, a first downlink signal from the BS by applying reception beamforming to avoid the first interference channel,
   wherein the first downlink signal is not mapped to the resource elements corresponding to the first CSI-RS configuration; and
   receiving, on a second subframe which is not included in the set of subframes, a second downlink signal from the BS,
   wherein the second downlink signal is received without estimating an interference channel from the neighboring BS.

2. The method according to claim 1, wherein the second downlink signal is received by applying the reception beamforming using the first interference channel which is estimated on the first subframe.

3. The method according to claim 1, wherein the information of the set of subframes and the information of the plurality of CSI-RS configurations are received via a higher layer signaling, and the indication is received via a physical layer signaling.

4. The method according to claim 1, wherein the information of the set of subframes and the information of the plurality of CSI-RS configurations are received as a semi-static signaling, and the indication is received as a dynamic signaling.

5. A user equipment (UE) apparatus in a wireless communication system, the UE apparatus comprising:
   a Radio Frequency (RF) module; and
   a processor operably coupled with the RF module and configured to:
      receive, from a base station (BS), information of a set of subframes and information of a plurality of channel status information-reference signal (CSI-RS) configurations configured for the set of subframes,
      receive, from the BS, an indication indicating a first CSI-RS configuration among the plurality of CSI-RS configurations,
      estimate, on a first subframe included in the set of subframes, a first interference channel from a neighboring BS using resource elements corresponding to the first CSI-RS configuration, and
      receive, on the first subframe, a first downlink signal from the BS by applying reception beamforming to avoid the first interference channel,
      wherein the first downlink signal is not mapped to the resource elements corresponding to the first CSI-RS configuration,
      receive, on a second subframe which is not included in the set of subframes, a second downlink signal from the BS, and
      wherein the second downlink signal is received without estimating an interference channel from the neighboring BS.

6. The UE apparatus according to claim 5, wherein the second downlink signal is received by applying the reception beamforming using the first interference channel which is estimated on the first subframe.

7. The UE apparatus according to claim 5, wherein the information of the set of subframes and the information of the plurality of CSI-RS configurations are received via a higher layer signaling, and the indication is received via a physical layer signaling.

8. The UE apparatus according to claim 5, wherein the information of the set of subframes and the information of the plurality of CSI-RS configurations are received as a semi-static signaling, and the indication is received as a dynamic signaling.

* * * * *